US010805008B1

(12) United States Patent
Pelouch et al.

(10) Patent No.: US 10,805,008 B1
(45) Date of Patent: Oct. 13, 2020

(54) OPTICAL AMPLIFIERS THAT SUPPORT GAIN CLAMPING AND OPTIONALLY POWER LOADING

(71) Applicant: Neptune Subsea IP Limited, London (GB)

(72) Inventors: Wayne S. Pelouch, McKinney, TX (US); Edwin A. Zak, McKinney, TX (US)

(73) Assignee: Neptune Subsea IP Limited, London (GB)

( * ) Notice: Subject to any disclaimer, the term of this patent is extended or adjusted under 35 U.S.C. 154(b) by 0 days.

(21) Appl. No.: 16/593,748

(22) Filed: Oct. 4, 2019

(51) Int. Cl.
*H04B 10/293* (2013.01)
*H01S 3/067* (2006.01)
*H04B 10/079* (2013.01)
*H04J 14/02* (2006.01)
*H04B 10/80* (2013.01)

(52) U.S. Cl.
CPC ..... *H04B 10/2931* (2013.01); *H01S 3/06716* (2013.01); *H04B 10/07955* (2013.01); *H04J 14/0221* (2013.01); *H04B 10/80* (2013.01)

(58) Field of Classification Search
None
See application file for complete search history.

(56) References Cited

U.S. PATENT DOCUMENTS

| 5,088,095 A | 2/1992 | Zirngibl |
| 5,633,964 A | 5/1997 | DiGiovanni et al. |
| 6,008,932 A | 12/1999 | Luo et al. |
| 6,094,298 A | 7/2000 | Luo et al. |
| 6,307,667 B1* | 10/2001 | Liang ............ H01S 3/1302 359/337 |
| 6,424,456 B1* | 7/2002 | Lee ............ H01S 3/06754 359/337 |
| 6,950,232 B1* | 9/2005 | Yam ............ H01S 3/1302 359/337.1 |

(Continued)

FOREIGN PATENT DOCUMENTS

EP 0745281 B1 6/2001

OTHER PUBLICATIONS

Luo et al., "Performance Degradation of All-Optical Gain-Clamped EDFA's Due to Relaxation-Oscillations and Spectral-Hole Burning in Amplified WDM Networks", IEEE Photonics Technology Letters, vol. 9, No. 10, Oct. 1997, 3 pages.

(Continued)

*Primary Examiner* — David W Lambert

(57) ABSTRACT

An apparatus includes an optical amplifier configured to receive an input optical signal and generate an amplified output optical signal. The optical amplifier includes multiple amplifier stages including at least a first amplifier stage and a second amplifier stage. The apparatus also includes a gain clamp configured to accumulate optical power from the first amplifier stage after an optical power level of the input optical signal drops and provide a first portion of the accumulated optical power to the first amplifier stage to clamp a gain applied by the first amplifier stage. The gain clamp is also configured to provide a second portion of the accumulated optical power to the second amplifier stage to adjust a gain applied by the second amplifier stage. The second amplifier stage is configured to amplify the second portion of the accumulated optical power.

24 Claims, 9 Drawing Sheets

(56) References Cited

U.S. PATENT DOCUMENTS

| | | | |
|---|---|---|---|
| 6,989,923 B2 | 1/2006 | Stentz | |
| 7,065,300 B1 * | 6/2006 | Walker | H01S 5/0265 |
| | | | 359/263 |
| 7,876,498 B1 * | 1/2011 | Honea | H01S 3/06758 |
| | | | 359/341.41 |
| 2010/0091355 A1 * | 4/2010 | Ota | H04B 10/291 |
| | | | 359/337 |

OTHER PUBLICATIONS

Luo et al., "Experimental and Theoretical Analysis of Relaxation-Oscillations and Spectral Hole Burning Effects in All-Optical Gain-Clamped EDFA's for WDM Networks", Journal of Lightwave Technology, vol. 16, No. 4, Apr. 1998, 7 pages.

Chung et al., "Performances of all optical gain-clamped EDFAs with different feedback wavelengths for use in multiwavelength optical networks", OFC '97 Technical Digest, Feb. 1997, 3 pages.

Krol et al., "Gain Variations in Optically Gain Clamped Erbium Doped Fiber Amplifiers", ECOC'98, Sep. 1998, 3 pages.

\* cited by examiner

OPTICAL AMPLIFIERS THAT SUPPORT GAIN CLAMPING AND OPTIONALLY POWER LOADING

TECHNICAL FIELD

This disclosure relates generally to optical communication systems. More specifically, this disclosure relates to optical amplifiers that support gain clamping and optionally power loading.

BACKGROUND

Optical communication networks are often used to transport large amounts of data over long distances very quickly. At present, sophisticated optical communication networks are capable of transmitting tens of trillions of bits of information per second over a single optical fiber spanning many hundreds of kilometers. Optical communication networks generally exceed the bandwidth capabilities of copper networks. As a result, optical networks are often used to form undersea telecommunication networks and to form optical backbones in wireline telecommunication networks.

Optical communication networks routinely use optical amplifiers, such as rare-earth doped optical fiber amplifiers like erbium-doped fiber amplifiers (EDFAs), to amplify optical signals that are being transported through the networks. Often times, rare-earth doped optical fiber amplifiers have highly-saturated gains, which means that their gains are very sensitive to their input optical powers. Assume a rare-earth doped optical fiber amplifier has an output optical power that is supposed to remain generally constant. If such an amplifier typically amplifies a specified number of input optical signals and then suddenly loses one or some of those input signals or there is otherwise a drop in the input power to the amplifier, the amplifier typically compensates by increasing the gain applied to the remaining input signals in order to maintain substantially the same output power.

In cases where there is a drop in the number of input optical signals provided to an optical amplifier, the gain increases for the remaining input optical signals and causes the remaining input signals to have a higher per wavelength output power at an output of the optical amplifier. In addition, these gain increases typically do not have the same value for all input signal wavelengths, resulting in an output power spectrum that is tilted. In other words, some input signal wavelengths would have higher gain and therefore higher output power than the average of the whole spectrum. The presence of higher output powers typically causes higher nonlinear penalties during transmission through an optical communication link, which degrades signal quality and may actually result in the total loss of all transmitted data.

SUMMARY

This disclosure provides optical amplifiers that support gain clamping and optionally power loading.

In a first embodiment, an apparatus includes an optical amplifier configured to receive an input optical signal and generate an amplified output optical signal. The optical amplifier includes multiple amplifier stages including at least a first amplifier stage and a second amplifier stage. The apparatus also includes a gain clamp configured to accumulate optical power from the first amplifier stage after an optical power level of the input optical signal drops and provide a first portion of the accumulated optical power to the first amplifier stage to clamp a gain applied by the first amplifier stage. The gain clamp is also configured to provide a second portion of the accumulated optical power to the second amplifier stage to adjust a gain applied by the second amplifier stage. The second amplifier stage is configured to amplify the second portion of the accumulated optical power.

Any of the following features, individually or in any suitable combination, could be used with the apparatus of the first embodiment.

The gain clamp may include an optical splitter configured to receive the accumulated optical power and to split the accumulated optical power into the first and second portions. The gain clamp may also include a first optical multiplexer configured to provide the first portion of the accumulated optical power to the first amplifier stage.

The optical amplifier may include a second optical multiplexer configured to provide the second portion of the accumulated optical power to the second amplifier stage.

The apparatus may include at least one pump source configured to generate first optical pump power and second optical pump power, a third optical multiplexer configured to provide the first optical pump power to the first amplifier stage, and a fourth optical multiplexer configured to provide the second optical pump power to the second amplifier stage.

The second and fourth optical multiplexers may be configured to provide the second optical pump power and the second portion of the accumulated optical power to the second amplifier stage in opposite directions. The second and fourth optical multiplexers may also be configured to provide the second optical pump power and the second portion of the accumulated optical power to the second amplifier stage in a common direction.

One of the first optical multiplexer or the gain clamp may include a filter configured to force the accumulated optical power to at least one wavelength that is not included in the input optical signal.

The gain clamp may include a nonlinear optical limiter configured to limit spikes in the accumulated optical power.

The second amplifier stage may be configured to generate the amplified output optical signal as a combination of an amplified version of the input optical signal and an amplified version of the second portion of the accumulated optical power, or the apparatus may include an optical multiplexer configured to combine the amplified version of the input optical signal with the amplified version of the second portion of the accumulated optical power to produce the amplified output optical signal.

The apparatus may include an optical demultiplexer configured to separate an amplified version of the input optical signal from an amplified version of the second portion of the accumulated optical power, where the amplified version of the input optical signal represents the amplified output optical signal.

The apparatus may include a first attenuator configured to reduce a power level of the first portion of the accumulated optical power and/or a second attenuator configured to reduce a power level of the second portion of the accumulated optical power.

The gain clamp may be configured to provide the first portion of the accumulated optical power to the first amplifier stage and to provide the second portion of the accumulated optical power to the second amplifier stage in order to maintain an overall gain of the optical amplifier substantially constant regardless of whether the optical power level of the input optical signal has dropped.

The optical amplifier may be configured to include an amplified version of the second portion of the accumulated optical power in the amplified output optical signal in order to maintain a total output power substantially constant regardless of whether the optical power level of the input optical signal has dropped.

In a second embodiment, a system includes one or more optical transmitters configured to generate multiple optical wavelength signals. The system also includes a first optical multiplexer configured to combine the optical wavelength signals and generate an input optical signal. The system further includes an optical amplifier configured to receive and amplify the input optical signal and generate an amplified output optical signal. The optical amplifier includes multiple amplifier stages including at least a first amplifier stage and a second amplifier stage. In addition, the system includes a gain clamp configured to accumulate optical power from the first amplifier stage after an optical power level of the input optical signal drops and provide a first portion of the accumulated optical power to the first amplifier stage to clamp a gain applied by the first amplifier stage. The gain clamp is also configured to provide a second portion of the accumulated optical power to the second amplifier stage to adjust a gain applied by the second amplifier stage. The second amplifier stage is configured to amplify the second portion of the accumulated optical power.

Any of the following features, individually or in any suitable combination, could be used with the system of the second embodiment.

The gain clamp may include an optical splitter configured to receive the accumulated optical power and to split the accumulated optical power into the first and second portions. The gain clamp may also include a second optical multiplexer configured to provide the first portion of the accumulated optical power to the first amplifier stage.

The optical amplifier may include a third optical multiplexer configured to provide the second portion of the accumulated optical power to the second amplifier stage.

The optical amplifier may include at least one pump source configured to generate first optical pump power and second optical pump power, a fourth optical multiplexer configured to provide the first optical pump power to the first amplifier stage, and a fifth optical multiplexer configured to provide the second optical pump power to the second amplifier stage.

One of the second optical multiplexer or the gain clamp may include a filter configured to force the accumulated optical power to at least one wavelength that is not included in the input optical signal.

The gain clamp may include a nonlinear optical limiter configured to limit spikes in the accumulated optical power.

The second amplifier stage may be configured to generate the amplified output optical signal as a combination of an amplified version of the input optical signal and an amplified version of the second portion of the accumulated optical power, or the optical amplifier may include a second optical multiplexer configured to combine the amplified version of the input optical signal with the amplified version of the second portion of the accumulated optical power to produce the amplified output optical signal.

The optical amplifier may include an optical demultiplexer configured to separate an amplified version of the input optical signal from an amplified version of the second portion of the accumulated optical power, where the amplified version of the input optical signal represents the amplified output optical signal.

The gain clamp may be configured to provide the first portion of the accumulated optical power to the first amplifier stage and to provide the second portion of the accumulated optical power to the second amplifier stage in order to maintain an overall gain of the optical amplifier substantially constant regardless of whether the optical power level of the input optical signal has dropped.

The optical amplifier may be configured to include an amplified version of the second portion of the accumulated optical power in the amplified output optical signal in order to maintain a total output power substantially constant regardless of whether the optical power level of the input optical signal has dropped.

The optical multiplexer may include a wavelength-selective switch.

The system may include an optical channel monitor configured to measure optical power at multiple wavelengths included in the optical wavelength signals. The system may also include an optical power source configured to generate optical loading power at one or more of the wavelengths identified by the optical channel monitor as lacking optical power.

In a third embodiment, a method includes receiving an input optical signal at an optical amplifier, where the optical amplifier includes multiple amplifier stages including at least a first amplifier stage and a second amplifier stage. The method also includes, using the optical amplifier, generating an amplified output optical signal. The method further includes, using a gain clamp, accumulating optical power from the first amplifier stage after an optical power level of the input optical signal drops and providing a first portion of the accumulated optical power to the first amplifier stage to clamp a gain applied by the first amplifier stage and providing a second portion of the accumulated optical power to the second amplifier stage to adjust a gain applied by the second amplifier stage. In addition, the method includes, using the second amplifier stage, amplifying the second portion of the accumulated optical power.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
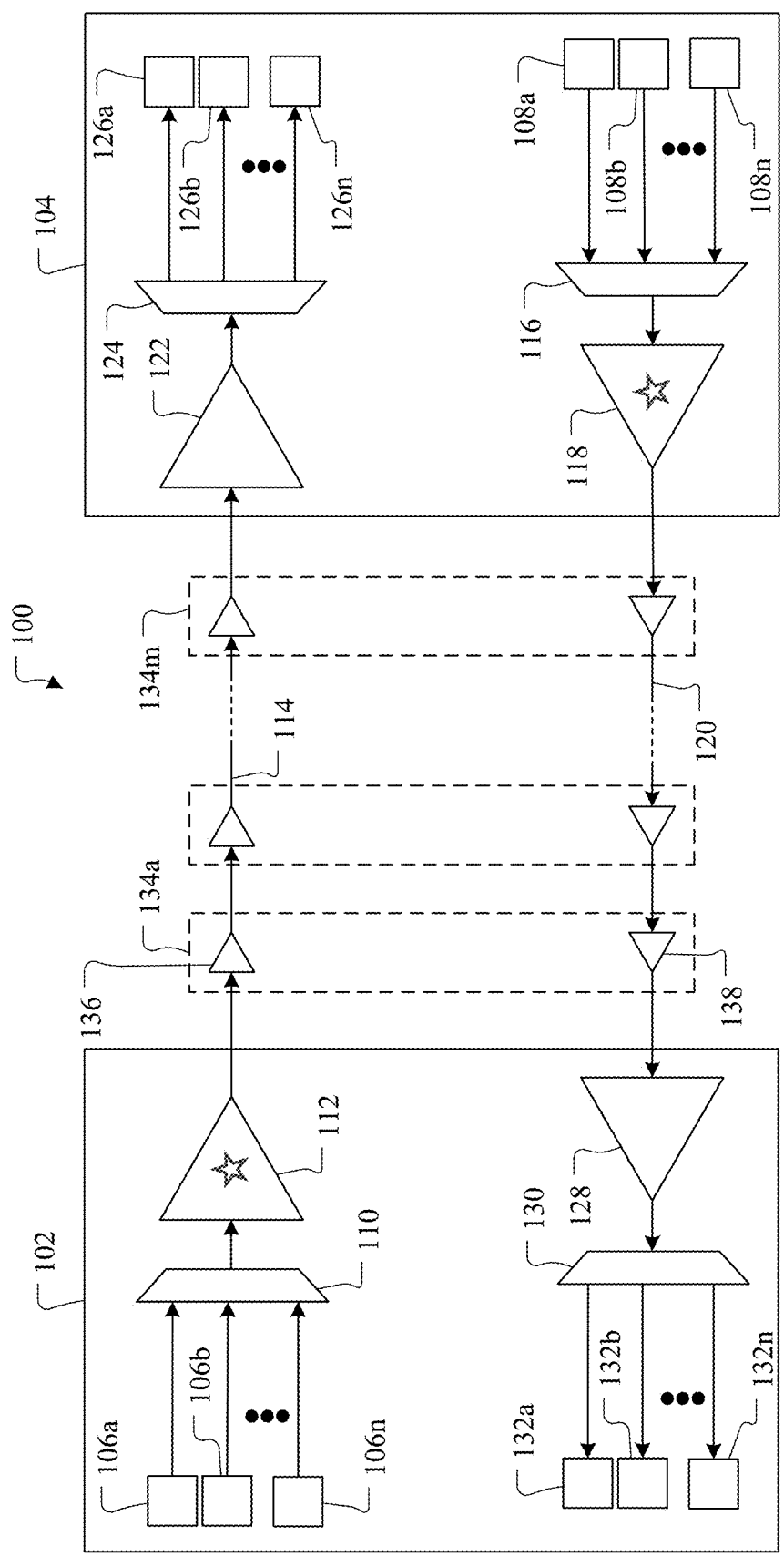
FIG. 1 illustrates an example optical communication network according to this disclosure.

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, various problems can arise when rare-earth doped optical fiber amplifiers or other optical amplifiers lose one or some of their input optical signals or there is otherwise a drop in the input power to the amplifier. However, various approaches for handling these types of situations can suffer from a number of shortcomings. For example, in some approaches, the pump power being used by an optical amplifier to perform signal amplification can be reduced when one or some input optical signals are lost or reduced in optical power, which allows the amplifier's gain to be maintained at a substantially constant value. Unfortunately, this also typically decreases the amplifier's output power, requires that every amplifier along an optical communication link make similar changes, and often results in over-shooting and/or under-shooting of the previous gain value. Also, this cannot be used in optical amplifiers that operate at fixed pump powers and that lack transient pump power controls, which is often the case in submarine "repeatered" links having multiple optical amplifiers known as repeaters.

In other approaches, "loading" can be applied to an optical amplifier, where the loading represents optical power at wavelengths not being used in the input optical signals for data communication. The optical amplifier amplifies the input optical signals and the loading, ideally resulting in a substantially constant gain being applied across all relevant wavelengths. Generally speaking, loading is reduced as the number of input optical signals is increased (or vice versa) so that the total optical power remains substantially constant over the operational lifetime of an optical communication link. If one or some of the input optical signals are lost, loading can be applied so that optical power appears at the lost signal wavelengths, which ideally helps the optical amplifier to maintain the substantially constant gain across all relevant wavelengths. Often times, the goal here is to allow the optical amplifier to operate using a substantially constant fixed gain and a substantially constant pump power to achieve a substantially constant output power. While effective, this approach can be very slow, since it often takes several seconds for an unexpected loss of the input optical signal(s) to be detected and for the correct loading to be applied. This slow response allows improperly-amplified optical signals to propagate through an optical communication link (and possibly through one or more additional amplifiers along the link) for a period of time and may result in a loss of data transmission, which is highly undesirable.

In still other approaches, gain clamping can be used to optically achieve substantially constant gain control of an optical amplifier. In these approaches, an optical gain medium used for signal amplification is enclosed within a lasing cavity, and a lasing threshold for the gain medium is set at a desired gain value. In response to the loss of one or some input optical signals or some other reduction in optical input power to an amplifier, a gain clamping loop achieves a net gain and adequate optical power accumulates in the gain clamping loop, which saturates the gain value of the optical gain medium and helps to provide automatic all-optical gain control of the amplifier. However, two significant problems have generally prevented gain clamping approaches from being commercially deployed, namely spectral hole burning (SHB) and relaxation oscillations (RO). Spectral hole burning results from inhomogeneous gains, where a strong input optical signal can locally saturate (reduce) the gain relative to the rest of the input signal wavelengths. This can prevent an average gain difference of approximately 0 dB from being achieved across the full spectrum between the normal case (at full input power) and the gain-clamped case (at, for example, 10% input power). It is also extremely difficult to force the lasing wavelength to exist at multiple wavelengths, since the lasing cavity or gain clamping loop loss would need to be fine-tuned to exactly match the variable natural gain profile of the amplifier medium as a function of wavelength. Relaxation oscillations occur in the lasing cavity and are the result of laser dynamics as a laser transitions from an inactive state to a lasing state. The relaxation oscillation frequency is dependent on the pumping rate, the remaining input signal power, and the length of the laser cavity or loop (or stated another way, the frequency is dependent on the laser roundtrip gain and transit time).

This disclosure provides various architectures for rare-earth doped optical fiber amplifiers or other optical amplifiers, which may be useful in submarine repeatered communication links or in other optical communication links, systems, or networks. As described in more detail below, some embodiments of the optical amplifiers support gain clamping, while other embodiments of the optical amplifiers support gain clamping and power loading. In both types of embodiments, the optical amplifiers are implemented using multiple amplifier stages. In each optical amplifier, a gain clamp is used with one amplifier stage to control the gain of that amplifier stage. A significant portion of the optical power accumulated in the gain clamp is also transmitted as a gain clamp output to at least one subsequent amplifier stage, and the gain clamp output helps to effectively saturate or otherwise adjust the gain of the at least one subsequent amplifier stage. This allows the overall gain of each optical amplifier to be maintained at approximately the same value across the full amplifying spectrum regardless of whether the gain clamp is active or inactive, which helps to reduce or minimize the impact of spectral hole burning. Also, an optional nonlinear optical limiter can be included within the gain clamp to reduce or minimize relaxation oscillations.

To support power loading, the optical power in the gain clamp output from the gain clamp is amplified by the at least one subsequent amplifier stage and is included in the output of the optical amplifier. Due to the input of the optical power from the gain clamp into the at least one subsequent amplifier stage for amplification, the optical amplifier generally operates to produce a total output having a substantially constant output power (as a sum of the signal and loading output power) regardless of whether the gain clamp is active or inactive. Note, however, that the use of power loading is optional, and the optical power in the gain clamp output from the gain clamp can be removed from or not combined with the amplified output produced by the at least one subsequent amplifier stage. This allows the optical amplifier to operate with a non-constant output power, which may be acceptable in various implementations.

In this way, the optical amplifiers described in this patent document can reduce or minimize the impacts of input optical signal loss or other input power reduction on the operation of rare-earth doped optical fiber amplifiers or other optical amplifiers. Among other things, the gains applied by the optical amplifiers to their input optical signals can remain substantially the same regardless of whether one or some of the input optical signals are lost or otherwise reduced in optical power. Also, some embodiments of the optical amplifiers can maintain substantially the same output power regardless of whether one or some of the input optical signals are lost or otherwise reduced in optical power, enabling use of the optical amplifiers in various types of environments (such as submarine repeatered optical communication links). In addition, the optical amplifiers can achieve improved results while reducing or minimizing the impacts of spectral hole burning and relaxation oscillations.

FIG. 1 illustrates an example optical communication network 100 according to this disclosure. As shown in FIG. 1, in the optical communication network 100, information is communicated between two terminals 102 and 104 via the use of optical signals. For convenience or for purposes of convention, optical signals traveling from the terminal 102 to the terminal 104 may be referred to as "eastern" optical signals, while optical signals traveling from the terminal 104 to the terminal 102 may be referred to as "western" optical signals. The terms "eastern" and "western" here are simply used to allow for easy distinction between the optical signals traveling in opposite directions. The use of the terms "eastern" and "western" does not imply any actual geographical relation of components in FIG. 1 or any actual physical direction of optical signals. For instance, the terminal 102 may be geographical located eastward of the terminal 104, even though the convention used here has "eastern" optical signals traveling from the terminal 102 to the terminal 104.

In some embodiments, the optical signals communicated between the terminals 102 and 104 are Wavelength Division Multiplexed (WDM) optical signals and potentially Dense Wavelength Division Multiplexed (DWDM) optical signals. In WDM or DWDM, information is communicated over each of multiple distinct optical channels referred to as "optical wavelength channels." Each optical wavelength channel is allocated a particular frequency or frequency range for optical communication. Optical signals that fall within the various frequencies or frequency ranges may be referred to as optical wavelength signals.

In order to communicate using WDM, DWDM, or other optical signals, the terminal 102 includes n optical transmitters 106a-106n. Depending on the implementation, the terminal 102 may include any suitable number of optical transmitters 106a-106n, such as two, three, four, or more optical transmitters 106a-106n. Each optical transmitter 106a-106n is configured to generate one or more optical wavelength signals within at least one optical wavelength channel for eastern transmission. Similarly, the terminal 104 includes n optical transmitters 108a-108n. Depending on the implementation, the terminal 104 may include any suitable number of optical transmitters 108a-108n, such as two, three, four, or more optical transmitters 108a-108n. Each optical transmitter 108a-108n is configured to generate one or more optical wavelength signals within at least one optical wavelength channel for western transmission.

Each optical transmitter 106a-106n, 108a-108n includes any suitable structure configured to generate at least one optical signal for transmission. For instance, lasers may be appropriate optical transmitters 106a-106n, 108a-108n for transmitting at particular frequencies or within particular frequency bands. The optical transmitters 106a-106n, 108a-108n may also include multiple lasers that can be tunable within desired frequency ranges. Note that the principles described in this patent document are not limited to communications in which the number of eastern optical wavelength channels is the same as the number of western optical wavelength channels. Also, the principles described in this patent document are not limited to any particular structure of each optical transmitter 106a-106n, 108a-108n.

In the terminal 102, a multiplexer 110 multiplexes the optical wavelength signals from the optical transmitters 106a-106n into a single eastern optical signal, which is optically amplified by an eastern optical amplifier 112 prior to being transmitted onto a first optical communication pathway 114. Similarly, in the terminal 104, a multiplexer 116 multiplexes the optical wavelength signals from the optical transmitters 108a-108n into a single western optical signal, which is optically amplified by a western optical amplifier 118 prior to being transmitted onto a second optical communication pathway 120.

Each multiplexer 110, 116 includes any suitable structure configured to multiplex or otherwise combine multiple optical signals for communication over a common communication link. In some embodiments, for instance, each multiplexer 110, 116 may represent a wavelength-selective switch. Each optical amplifier 112, 118 includes any suitable structure configured to amplify optical signals. In some embodiments, the amplifiers 112, 118 represent rare-earth doped optical fiber amplifiers, such as erbium-doped fiber amplifiers (EDFAs). Each optical communication pathway 114, 120 includes any suitable optical communication medium or media, such as an optical cable having one or more optical fibers. Note that while the optical communication pathways 114, 120 are shown as being separate here, the optical communication pathways 114, 120 often represent different optical fibers in the same optical cable (although that need not be the case).

The eastern optical signal transmitted over the optical communication pathway 114 is received by the terminal 104 and may optionally be amplified at the terminal 104 using an optical amplifier 122. A demultiplexer 124 demultiplexes the eastern optical signal into the various optical wavelength signals within the optical wavelength channels. The optical wavelength signals are provided to and processed by corresponding optical receivers 126a-126n, which are configured to extract data from or otherwise process the optical wavelength signals. Similarly, the western optical signal transmitted over the optical communication pathway 120 is received by the terminal 102 and may optionally be amplified at the terminal 102 using an optical amplifier 128. A demultiplexer 130 demultiplexes the western optical signal into the various optical wavelength signals within the optical wavelength channels. The optical wavelength signals are provided to and processed by corresponding optical receivers 132a-132n, which are configured to extract data from or otherwise process the optical wavelength signals.

Each amplifier 122, 128 includes any suitable structure configured to amplify optical signals. In some embodiments, the amplifiers 122, 128 represent rare-earth doped optical fiber amplifiers, such as erbium-doped fiber amplifiers. Each demultiplexer 124, 130 includes any suitable structure configured to demultiplex or otherwise separate multiple optical signals received over a common communication link. In some embodiments, for instance, each demultiplexer 124, 130 may represent a wavelength-selective switch. Note that while shown as being separate here, the multiplexer 110 and the demultiplexer 130 in the terminal 102 could be implemented using a single wavelength-selective switch or other common structure, and the multiplexer 116 and the demultiplexer 124 in the terminal 104 could be implemented using a single wavelength-selective switch or other common structure. Each optical receiver 126a-126n, 132a-132n includes any suitable structure configured to receive and process one or more optical signals.

It should be noted that one or both terminals 102 and 104 do not necessarily require all of the components shown in FIG. 1. For example, the optical amplifiers 122 and 128 might not be needed in some configurations. Also, if present, each of the optical amplifiers 112, 118, 122, 128 may represent a combination of multiple optical amplifiers if desired.

In the example shown in FIG. 1, the optical communication pathways 114, 120 are divided into multiple segments using one or more repeaters 134a-134m. Each repeater 134a-134m typically includes an amplifier 136 for amplifying the optical signal being transmitted over the optical communication pathway 114 and an amplifier 138 for amplifying the optical signal being transmitted over the optical communication pathway 120. Each segment of the optical communication pathways 114, 120 may be implemented using at least one optical cable having one or more optical fibers or other suitable pathways for optical signals. In this particular example, there are m amplifiers 136 and m+1 segments along the optical communication pathway 114, and there are m amplifiers 138 and m+1 segments along the optical communication pathway 120. However, there is no requirement that the number of amplifiers 136, 138 in each direction be equal. Also, there is no requirement that any repeaters be used in the optical communication network 100. In that case, the network 100 is often referred to as an "unrepeatered" optical communication network, and a single fiber link can form each (or both) of the optical communication pathways 114, 120.

Each amplifier 136, 138 includes any suitable structure configured to receive, re-generate or amplify, and transmit one or more optical signals. For example, each amplifier 136, 138 may represent a rare-earth doped optical fiber amplifier (such as an erbium-doped fiber amplifier) or a Raman amplifier. In some embodiments, each amplifier 136, 138 may consume electrical power to amplify the associated optical signal(s), and the electrical power is often provided over the cable or cables forming the optical communication pathways 114, 120.

Often times, the optical path length between each pair of repeaters 134a-134m is approximately the same. The distance between repeaters 134a-134m can depend on various factors, such as the total terminal-to-terminal optical path distance, the data rate, the quality of the optical fiber, the loss-characteristics of the optical fiber, the number of repeaters 134a-134m (if any), the amount of electrical power deliverable to each repeater 134a-134m (if there are repeaters), and so forth. A typical optical path length between repeaters 134a-134m (or from terminal to terminal in an unrepeatered system) for high-quality single-mode fiber might be about 80 kilometers, and in practice may range from 40 kilometers or less to 140 kilometers or more. That said, the principles described here are not limited to any particular optical path distances between repeaters 134a-134m, nor are they limited to repeatered systems in which the optical path distances between repeaters 134a-134m are the same or even to repeatered systems in general.

In some embodiments, the amplifiers 136, 138 in each of the repeaters 134a-134m may be placed within a box or other common structure that is mounted on or otherwise coupled to the optical cable or cables forming the optical communication pathways 114, 120. This may support various features in the network 100, such as the ability for information to be exchanged between the amplifiers 136, 138 in each repeater 134a-134m. However, this is not required, and the amplifiers 136 and 138 may be installed or deployed in any other suitable manner.

As described in more detail below, at least one of the optical amplifiers in the network 100 supports gain clamping and optionally power loading. This functionality allows the optical amplifier or amplifiers to more effectively maintain a substantially constant gain (and optionally a substantially constant output power) in the event that one or some input optical signals are lost or otherwise reduced in optical power. This may be particularly useful, for example, in the optical amplifiers 112 and 118, since they are supplying optical signals to the optical communication pathways 114, 120 for communication. These optical amplifiers 112 and 118 may also need to ensure that proper optical signals are provided to the repeaters 134a-134m, since the amplifiers 136, 138 may have fixed pump powers or lack transient pump power controls and therefore might be unable to adjust their operation based on the loss/reduction of one or more optical signals. Note, however, that the gain clamping functionality and the power loading functionality may be used in any other suitable amplifiers. Additional details regarding this functionality are provided below.

Although FIG. 1 illustrates one example of an optical communication network 100, various changes may be made to FIG. 1. For example, the optical communication network 100 here is represented in simplified form for purposes of illustration and explanation only. The principles described in this patent document may extend to much more complex optical communications networks. As a particular example, the principles described here may be applied to optical communication networks in which there are multiple fiber pairs, each pair for communicating WDM, DWDM, or other optical signals between the same terminals 102 and 104 or between the terminals 102, 104 and other terminals. As another particular example, the principles described here may be applied to optical communication networks in which there are one or more branching nodes that split one or more fiber pairs and/or optical wavelength channels in one direction and one or more fiber pairs and/or optical wavelength channels in another direction. In general, the gain clamping functionality and the power loading functionality described here may be used with any suitable optical amplifier and in any suitable optical system or network.

Figure 2A:
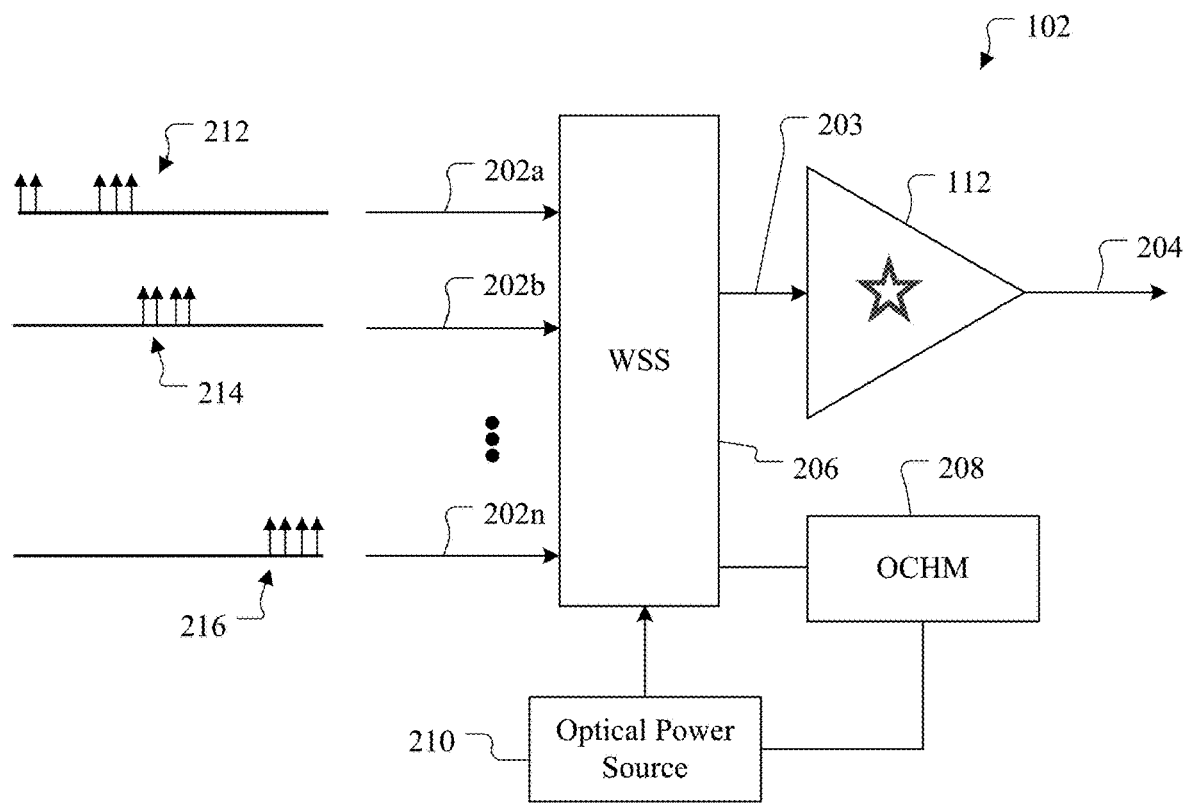
FIGS. 2A through 2C illustrate an example terminal having an optical amplifier that supports gain clamping and optionally power loading and example operation of the optical amplifier according to this disclosure.
Figure 2B:
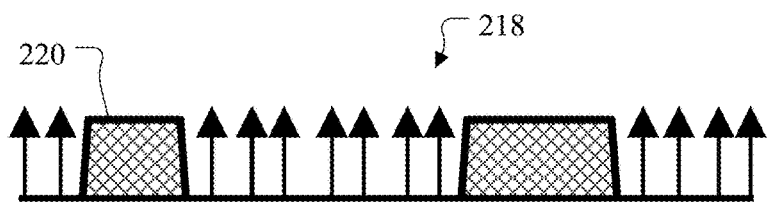
Figure 2C:
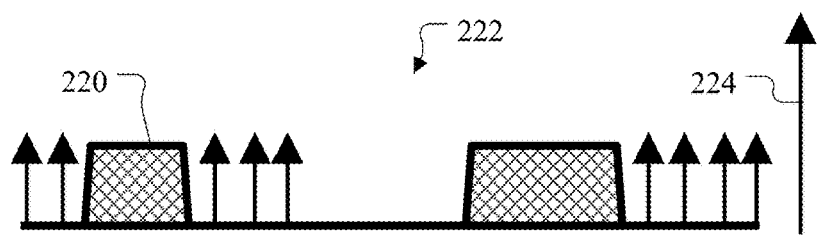

FIGS. 2A through 2C illustrate an example terminal 102 having an optical amplifier 112 that supports gain clamping and optionally power loading and example operation of the optical amplifier 112 according to this disclosure. Note that the same or similar setup may also or alternatively be used in the terminal 104 with the optical amplifier 118 or in any other suitable terminals or other devices with any other suitable optical amplifiers. For ease of explanation, the terminal 102 and operations shown in FIGS. 2A through 2C are described with respect to the optical communication network 100 of FIG. 1. However, the terminal 102 may be used in any other suitable optical communication system or network, and the optical amplifier 112 may be used in any other suitable device, system, or network.

As shown in FIG. 2A, the terminal 102 receives, generates, or otherwise obtains multiple input optical signals 202a-202n, which may represent the optical wavelength signals from the optical transmitters 106a-106n. The terminal 102 generally operates to combine the input optical signals 202a-202n to produce at least one combined signal 203 and to amplify the at least one combined signal 203 to produce one or more amplified output optical signals 204. In this example, the input optical signals 202a-202n are combined using a wavelength-selective switch (WSS) 206, although any other suitable multiplexer or other optical signal combiner may be used here. The wavelength-selective switch 206 includes any suitable structure configured to route optical signals based on wavelength. In some embodiments, the wavelength-selective switch 206 includes an array of 1×n switches. The combined signal 203 generated by the wavelength-selective switch 206 is provided to the optical amplifier 112 for amplification.

As shown in this example, the terminal 102 supports external power loading of the optical amplifier 112 using an optical channel monitor (OCHM) 208 and an optical power source 210. The optical channel monitor 208 monitors the amount of optical power contained in the input optical signals 202a-202n at various wavelengths or wavelength bands. If necessary, the optical channel monitor 208 controls the operation of the optical power source 210 or the wavelength-selective switch 206 so that a specified amount of optical power at one or more wavelengths or wavelength bands is included in the combined signal 203. The optical channel monitor 208 includes any suitable structure configured to measure optical power at various wavelengths or wavelength bands and to detect missing, restored, or fluctuating optical channels. The optical power source 210 includes any suitable structure configured to generate optical power, such as one or more lasers.

In FIG. 2A, three example spectra 212, 214, 216 illustrate possible spectra for three of the input optical signals 202a, 202b, and 202n. Each of these spectra 212, 214, 216 illustrates the wavelengths that could be used in the associated input optical signal 202a, 202b, and 202n to transport data. As can be seen here, the spectra 212, 214, 216 do not overlap, which allows the input optical signals 202a, 202b, and 202n to be combined by the wavelength-selective switch 206 into a single combined signal 203 while retaining all of the data from the original input optical signals 202a, 202b, and 202n.

FIG. 2B illustrates a spectrum 218 that can be output by the optical amplifier 112 based on the spectra 212, 214, 216 of the input optical signals 202a, 202b, and 202n. The wavelengths from the various spectra 212, 214, 216 can be combined by the wavelength-selective switch 206 to produce a combined signal 203 having the spectrum 218 after amplification, and it can be seen that the wavelengths from the spectra 212, 214, 216 do not overlap in the spectrum 218. As a result, the output of the optical amplifier 112 still includes the data that was originally contained in the input optical signals 202a-202n.

Also included in the spectrum 218 here are one or more instances of optical loading power 220. The optical loading power 220 is provided by the optical power source 210 and is amplified by the optical amplifier 112. The optical loading power 220 provided by the optical power source 210 is based on optical power measurements or other measurements taken by the optical channel monitor 208. As can be seen in FIG. 2B, the instances of the optical loading power 220 here fill in gaps between the wavelengths contained in the input optical signals 202a-202n. Because of this, the input to the optical amplifier 112 has substantially equal optical powers across all relevant wavelengths. This results in a substantially steady optical power across all relevant wavelengths being output by the optical amplifier 112, as well.

In the event that one or some of the input optical signals 202a-202n are lost (meaning they are no longer input to or output by the wavelength-selective switch 206), the optical channel monitor 208 would detect this loss and cause the wavelength-selective switch 206 to insert optical power from the optical power source 210 as optical loading power 220 at the wavelength(s) or wavelength range(s) of the lost input optical signal(s) 202a-202n. However, it can take a relatively long period of time (such as several seconds or more) for the optical channel monitor 208 to detect the loss and for the wavelength-selective switch 206 to switch the optical loading power 220 from the optical power source 210 into the combined signal 203 in place of the lost input signal(s). During this time, the optical amplifier 112 may over-amplify the remaining input optical signals 202a-202n, which would also cause any additional amplifiers along a communication link (such as the amplifiers 136 or 138) to over-amplify or maintain a higher-than-desired output power per wavelength of the remaining input optical signals 202a-202n.

As described in more detail below, the optical amplifier 112 includes or is used in conjunction with a gain clamp. During normal operation in which all input optical signals 202a-202n are received by the optical amplifier 112 in the combined signal 203 and amplified, the gain clamp may have little or no impact on the operation of the optical amplifier 112. However, if one or some of the input optical signals 202a-202n are lost or are otherwise reduced in optical power within the combined signal 203, the gain clamp operates to clamp the gain of at least one stage of the optical amplifier 112. Also, some of the optical power accumulated in the gain clamp is output and used to saturate or otherwise adjust the gain of at least one other stage of the optical amplifier 112. This clamps the overall gain applied by the optical amplifier 112 to the input optical signals 202a-202n still contained in the combined signal 203, helping to maintain substantially the same gain as during normal operation. Also, as described in more detail below, the optical amplifier 112 optionally includes or is used in conjunction with out-of-band power loading functionality. This functionality allows the optical amplifier 112 to provide substantially the same output power in the amplified output signal 204, even in the presence of reduced input power and gain clamping.

One example result of this is shown in FIG. 2C, which illustrates a spectrum 222 associated with the output of the optical amplifier 112 after gain clamping and power loading have been applied in the optical amplifier 112. In FIG. 2C, it is assumed that the input optical signal 202b has been lost. Here, the spectrum 222 includes the wavelengths from the spectra 212 and 216 associated with the remaining input optical signals 202a and 202n. The spectrum 222 also includes the optical loading power 220 that is being applied, but no additional optical loading power 220 has been inserted by the wavelength-selective switch 206 at the wavelengths of the lost optical signal 202b. This may be due to the relatively slow speed of the optical channel monitor 208 in detecting the loss of the input optical signal 202b or due to the time needed for the wavelength-selective switch 206 to insert additional optical loading power 220 from the optical power source 210. To help compensate for this, additional optical loading power 224 is created based on gain clamping within the optical amplifier 112. Moreover, if the optical loading power 224 is included in the amplified output signal 204, the optical loading power 224 helps to keep the output power of the optical amplifier 112 substantially constant (compared to the output power during normal operation). In this document, "substantially constant" or "substantially the same" as it relates to gain indicates a difference of less than or equal to ±0.5 dB, and "substantially constant" or "substantially the same" as it relates to output power indicates a difference of less than or equal to ±0.5 dBm.

The optical amplifier 112 here is able to identify the loss/reduction of one or some of the input optical signals 202a-202n and adjust its operation much quicker than the optical channel monitor 208, the optical power source 210, and/or the wavelength-selective switch 206. For example, while it might take two or three seconds for the wavelength-selective switch 206 to provide optical loading power 220 for a missing or reduced input optical signal into the combined signal 203, the optical amplifier 112 may be able to generate optical loading power 224 for the missing or reduced input optical signal in about 10 µs or less (or at least faster than the response time of an optical amplifier without gain clamping). As explained below, this is due to the fact that the gain clamp operates to optically clamp the gain of the optical amplifier 112. In some embodiments, the optical channel monitor 208 may eventually cause the optical power source 210 to generate optical loading power 220 for any lost or reduced input optical signal(s) 202a-202n or cause the wavelength-selective switch 206 to switch in additional loading power 220 into the combined signal 203, at which point the optical amplifier 112 can automatically reduce the gain clamping effect and reduce the optical loading power 224 to maintain a substantially constant gain and optionally to maintain a substantially constant output power.

In the particular example shown in FIG. 2C, the optical loading power 224 created by the gain clamp and amplified by the optical amplifier 112 is shown as residing above the wavelengths used in all of the spectra 212, 214, 216 of the input optical signals 202a-202n. In some embodiments, any optical loading power 224 generated by the optical amplifier 112 may remain outside the wavelengths used in the input optical signals 202a-202n, which helps to prevent interference between the optical loading power 224 and the data being transmitted in the input optical signals 202a-202n. Also, in some embodiments, any optical loading power 224 generated by the optical amplifier 112 may remain inside the optical bandwidth of any repeater(s) 134a-134m or other optical device(s) that might receive the amplified output signal 204. As a particular example of this, a repeater or other amplifier (such as a subsea repeater) might support a conventional wavelength range of 1528 nm to 1567 nm (referred to as the "C-band"). The optical amplifier 112 using the techniques described in this patent document might operate over the wavelength range of 1528 nm to 1565 nm for the input optical signals 202a-202n and might generate gain-clamping optical loading power 224 at a wavelength of 1567 nm. Thus, both the wavelengths of the input optical signals 202a-202n and the wavelength of the optical loading power 224 would be within the supported bandwidth of the repeater or other amplifier without overlapping in wavelength. During a fault in which one or some of the input optical signals 202a-202n are lost or otherwise reduced in optical power, the optical amplifier 112 maintains substantially constant gain and additionally produces the optical loading power 224 at 1567 nm, which may maintain substantially constant total output power leaving the optical amplifier 112. A subsequent repeater or other amplifier would then maintain generally normal operation. Note, however, that the presence of the optical loading power 224 outside the wavelengths of the input optical signals 202a-202n is not necessarily required, and the optical loading power 224 may overlap with one or more wavelengths of the input optical signals 202a-202n. If overlap does occur, one or more of the remaining input optical signals 202a-202n might be unusable until the optical loading power 224 stops being generated.

Although FIGS. 2A through 2C illustrate one example of a terminal 102 having an optical amplifier 112 that supports gain clamping and optionally power loading and example operation of the optical amplifier 112, various changes may be made to FIGS. 2A through 2C. For example, the optical amplifier 112 does not need to be used with a wavelength-selective switch 206 and/or an optical channel monitor 208 and an optical power source 210. In general, an optical amplifier that supports gain clamping and optionally power loading may be used in any suitable terminal or other device, system, or network with any other suitable components. Also, the various spectra shown in FIGS. 2A through 2C are examples only and are merely meant to illustrate example ways in which the terminal 102 or the optical amplifier 112 may operate. As a particular example, while two instances of the optical loading power 220 are shown here, this is based on the specific example spectra 212, 214, 216 of the input optical signals 202a, 202b, and 202n. Other input optical signals 202a, 202b, and 202n may require the use of one or more different instances of optical loading power 220 or no optical loading power 220. In other embodiments, no optical loading power 220 may be used, and all loading is generated by the optical amplifier 112.

Figure 3:
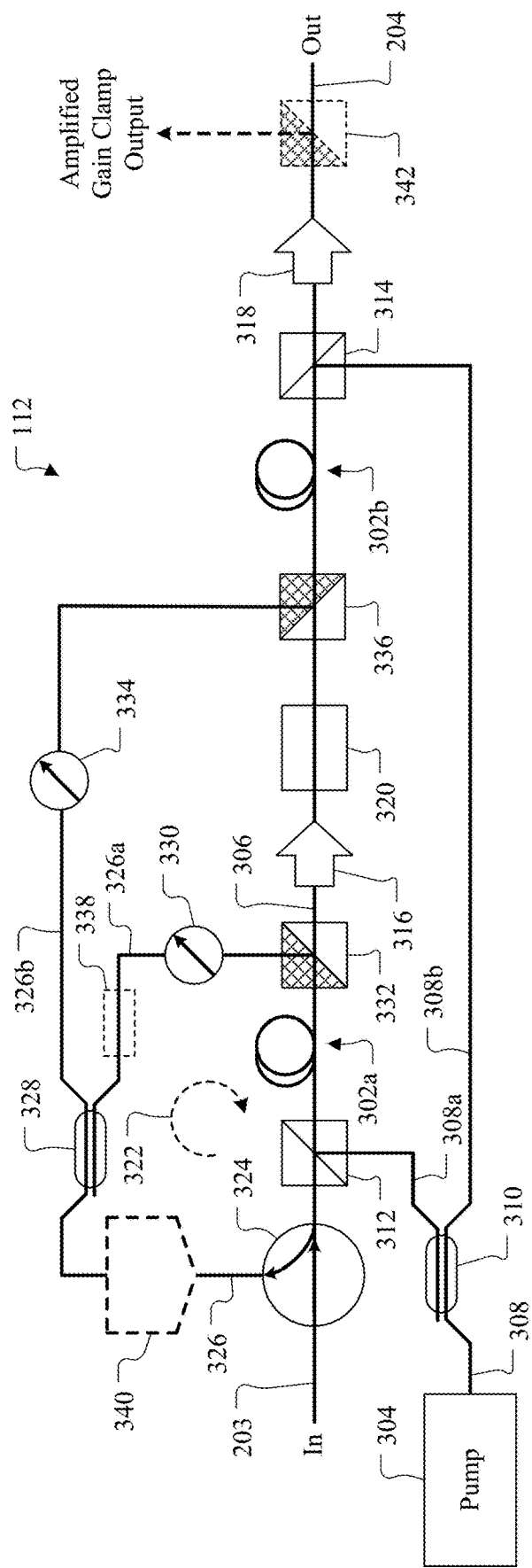
FIGS. 3 through 5 illustrate example optical amplifiers that support gain clamping and optionally power loading according to this disclosure.
Figure 4:
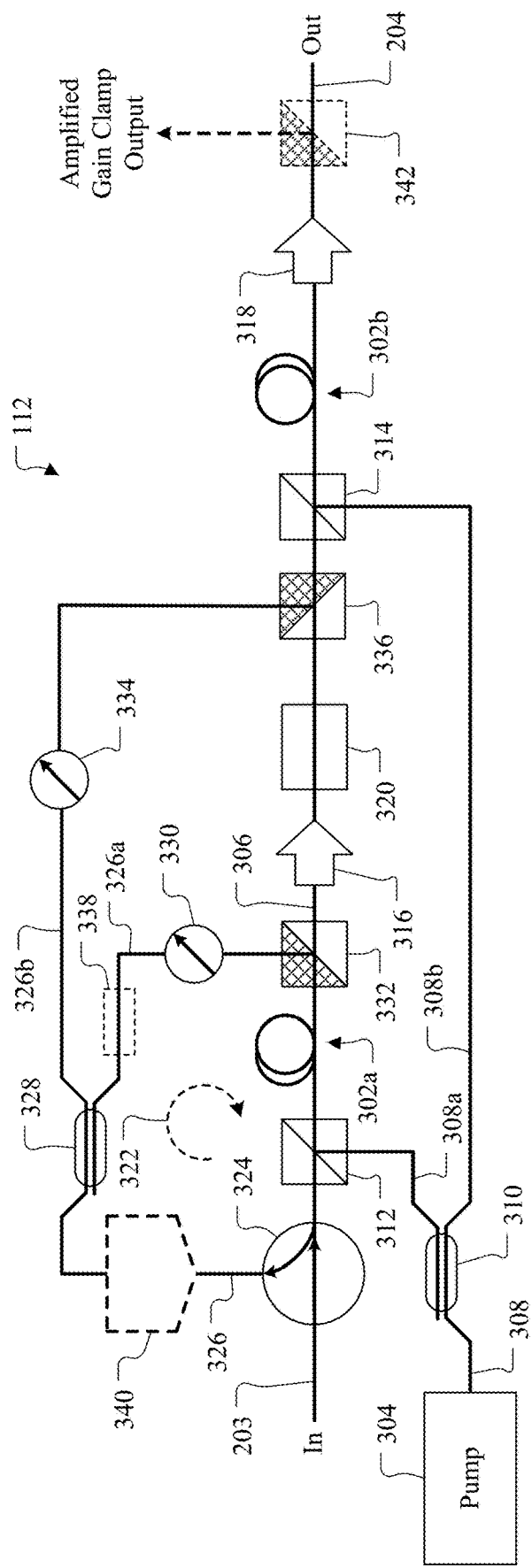
Figure 5:
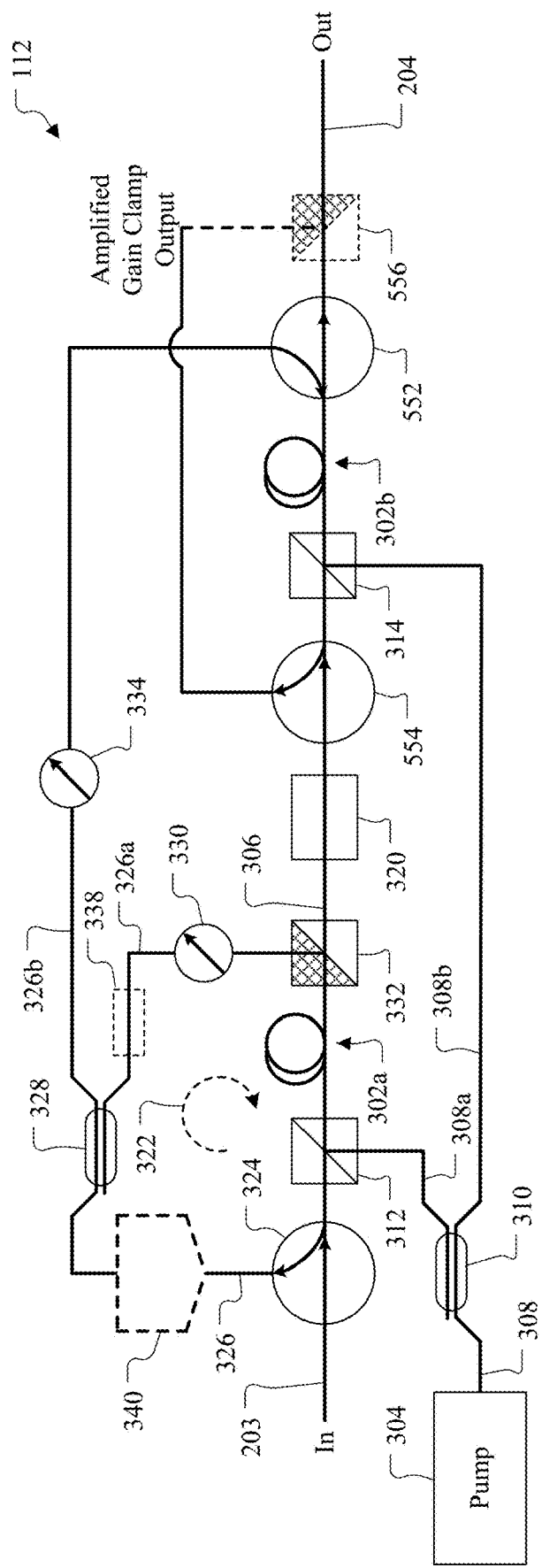

FIGS. 3 through 5 illustrate example optical amplifiers 112 that support gain clamping and optionally power loading according to this disclosure. Note that the same or similar setup may also or alternatively be used as the optical amplifier 118 or any other suitable optical amplifier(s). For ease of explanation, the optical amplifiers 112 shown in FIGS. 3 through 5 are described with respect to the optical communication network 100 of FIG. 1. However, the optical amplifiers 112 shown in FIGS. 3 through 5 may be used in any other suitable device, system, or network.

As shown in FIG. 3, the optical amplifier 112 includes multiple amplifier stages, including a first amplifier stage 302a and a second amplifier stage 302b, and at least one pump source 304. Each amplifier stage 302a-302b is configured to receive and amplify an input optical signal to produce an amplified output signal. The first amplifier stage 302a here is configured to receive and amplify the combined signal 203 to produce an optical signal 306. The second amplifier stage 302b here is configured to receive and amplify the optical signal 306 to produce the amplified output optical signal 204. Each amplifier stage 302a-302b is configured to provide some amount of gain to the optical signal being amplified, and the gain can vary based on wavelength. The amount of amplification provided by all amplifier stages 302a-302b collectively in the optical amplifier 112 at each wavelength or wavelength band defines the overall gain at that wavelength or wavelength band. Generally, it is often ideal for the gain of the optical amplifier 112 across all wavelengths or wavelength bands to be substantially equal. Note that while two amplifier stages 302a-302b are shown here, the optical amplifier 112 may include three or more amplifier stages. Each amplifier stage 302a-302b includes any suitable structure configured to amplify an optical signal. In this particular example, each amplifier stage 302a-302b represents a fiber amplifier stage, such as a rare-earth doped optical fiber amplifier stage (like an EDFA stage).

The at least one pump source 304 generates optical pump power 308, which is used to provide the necessary power for the amplifier stages 302a-302b to perform optical amplification. In this example, there is a single pump source 304 that provides the pump power 308 to an optical splitter 310, which divides the pump power 308 into pump power 308a for the amplifier stage 302a and pump power 308b for the amplifier stage 302b. However, it should be noted that different pump sources 304 may be used with different amplifier stages 302a-302b, in which case the optical splitter 310 could be omitted. It should also be noted that, in some embodiments, the pump power 308 is routed through the amplifier stage 302a, and remaining pump power is subsequently routed through the amplifier stage 302b. It will be understood by those skilled in the art that there are multiple mechanisms to provide suitable pump power 308 to the amplifier stages 302a-302b, and this disclosure is not limited to any particular technique. Each pump source 304 includes any suitable structure configured to generate optical pump power, such as one or more lasers. In some embodiments, each pump source 304 may represent a 980 nm laser. The optical splitter 310 includes any suitable structure configured to divide optical power, such as an optical splitting coupler.

In this example, the pump power 308a is combined with the signal 203 using an optical multiplexer 312, and the combined signal 203 and pump power 308a are fed into the first amplifier stage 302a. The pump power 308b is provided via an optical multiplexer 314 to the second amplifier stage 302b. This provides each amplifier stage 302a-302b with pump power used for the amplification. Each optical multiplexer 312, 314 includes any suitable structure configured to inject optical power from a pump source into an amplifier stage.

An optical isolator 316 is positioned between the amplifier stages 302a-302b and generally permits optical signals to flow from the amplifier stage 302a to the amplifier stage 302b and prevents the flow of optical signals or amplified spontaneous emissions in the opposite direction. Similarly, an optical isolator 318 is positioned between the amplifier stage 302b and external components and generally permits optical signals to flow from the amplifier stage 302b to the optical communication pathway 114 and prevents the flow of optical signals or amplified spontaneous emissions in the opposite direction. This may, for example, help to prevent unwanted signal reflections from traveling through the amplifier stages 302a-302b. Each optical isolator 316, 318 includes any suitable structure configured to permit and prevent the flow of optical signals in different directions.

A gain flattening filter 320 is also positioned between the amplifier stages 302a-302b. The gain flattening filter 320 generally operates to smooth out unequal optical power over a desired range of wavelengths, such as by removing excess optical powers at some wavelengths. This helps to flatten the gain profile of the amplifier 112. The gain flattening filter 320 includes any suitable structure configured to flatten the gain spectrum of an optical amplifier stage.

The optical amplifier 112 also includes a gain clamp 322, which operates across the first amplifier stage 302a to clamp the gain of the first amplifier stage 302a. Optical power generated within the gain clamp 322 is also used to adjust the gain of the second amplifier stage 302b. The path loss of the gain clamp 322 is configured to match a desired gain of the first amplifier stage 302a. As noted above, the amount of amplification provided by all amplifier stages 302a-302b collectively in the optical amplifier 112 defines the overall gain of the optical amplifier 112 (per wavelength or wavelength band). Clamping the gain of the amplifier stage 302a using the gain clamp 322 and adjusting the gain of the amplifier stage 302b based on optical power output from the gain clamp 322 can help to maintain the overall gain provided by the optical amplifier 112 at a substantially constant level, with or without all input optical signals 202a-202n being present in the combined signal 203.

In this particular example, the gain clamp 322 is implemented as a loop and includes a circulator 324. The circulator 324 operates to re-direct optical inputs received at different ports to other ports for output. In a three-port circulator, for instance, an optical signal received through the first port is output through the second port as an isolated path, an optical signal received through the second port is output through the third port as an isolated path, and an optical signal received through the third port is rejected. In this case, the circulator 324 operates to direct the signal 203 to the first amplifier stage 302a in one direction. The circulator 324 also operates to direct any gain clamp power 326 flowing through the first amplifier stage 302a in the opposite direction back into the gain clamp 322. The circulator 324 includes any suitable structure configured to directionally-multiplex or otherwise redirect incoming optical signals to different outputs.

The gain clamp power 326 from the circulator 324 is provided to an optical splitter 328, which divides the gain clamp power 326 into gain clamp power 326a and gain clamp output 326b. The gain clamp power 326a is directed through the amplifier stage 302a and back to the circulator 324 to create an optical lasing cavity. Thus, the optical splitter 328 acts as the lasing cavity output coupler. The gain clamp output 326b is provided to the second amplifier stage 302b. This allows one portion of the gain clamp power 326 (the gain clamp output 326b) to follow an optical path to the second amplifier stage 302b that is separate from the optical path used to send the optical signal 306 to the second amplifier stage 302b. The optical splitter 328 provides a significant fraction of the circulating gain clamp power 326 to the second amplifier stage 302b as the gain clamp output 326b along this separate optical path. In some embodiments, the gain clamp output 326b represents at least 50% of the gain clamp power 326. In particular embodiments, the gain clamp output 326b represents at least 80% of the gain clamp power 326. In some cases, the actual percentage may be limited only by the resulting path loss of the gain clamp 322, which further limits the desired gain value that can be clamped. The optical splitter 328 includes any suitable structure configured to divide optical power, such as an optical splitting coupler.

The gain clamp power 326a is provided to a variable optical attenuator 330, which attenuates or reduces the power level of the gain clamp power 326a. The gain clamp power 326a as attenuated is injected into the first amplifier stage 302a using an optical multiplexer 332. Similarly, the gain clamp output 326b is provided to a variable optical attenuator 334, which attenuates or reduces the power level of the gain clamp output 326b. The gain clamp output 326b as attenuated is injected into the second amplifier stage 302b using an optical multiplexer 336. Here, the variable optical attenuator 330 can be used to fine-tune the loss of the gain clamp 322 to match a desired gain, and the variable optical attenuator 334 can be used to fine-tune the amount of optical power being transmitted through the second amplifier stage 302b (to minimize amplifier gain and total output power difference). Note, however, that one or both optical attenuators 330, 334 may be omitted, such as when fine-tuning is not required. Each optical attenuator 330, 334 includes any suitable structure configured to reduce optical power. While described as being variable, each optical attenuator 330, 334 may alternatively provide a fixed amount of attenuation. Each optical multiplexer 332, 336 includes any suitable structure configured to inject optical power from a gain clamp into an amplifier stage, such as a WDM filter or other filter or a directionally-multiplexed optical component like a circulator.

In some embodiments, if the optical multiplexer 332 is implemented using a filter (such as a WDM filter), this filter can force the wavelength of the gain clamp power 326 in the gain clamp 322 to be different than the wavelengths used in the input optical signals 202a-202n. For example, the filter could force the gain clamp power 326 in the gain clamp 322 to be at a slightly longer wavelength than the wavelengths in any of the input optical signals 202a-202n. This helps to avoid overlap between the input optical signals 202a-202n and the gain clamp power 326. If the optical multiplexer 332 is implemented using a circulator or other component that does not include a filter, an optical filter 338 may be used in the gain clamp 322 to control the wavelength of the gain clamp power 326. The optical filter 338 includes any suitable structure configured to filter optical signals, such as a WDM filter or other filter. Note that the position of the optical filter 338 can vary from the position shown here. Also note that, as described above, overlap may be permitted between the gain clamp power 326 in the gain clamp 322 and the input optical signals 202a-202n, in which case no filter may be needed. Further, note that if the gain clamp power 326 and the gain clamp output 326b are not combined with signals in the same direction, overlap might not interfere with signal integrity.

An optional nonlinear optical limiter 340 may also be used in the gain clamp 322. The nonlinear optical limiter 340 operates to limit the gain clamp power 326 when the gain clamp power 326 becomes higher due to a nonlinear optical effect. For example, higher power spikes within the gain clamp 322 caused by relaxation oscillations can be partially suppressed by the nonlinear optical limiter 340, thereby reducing the relaxation oscillations. The nonlinear optical limiter 340 includes any suitable structure configured to selectively limit optical power. In some embodiments, the nonlinear optical limiter 340 represents an element that causes four-wave mixing (FWM), which spreads the spectrum of the gain clamp power 326 to additional wavelengths and/or a widened spectrum. The optical multiplexer 332 (if it includes a filter) or the optical filter 338 would typically have additional loss at wavelengths further from a central loop wavelength such that the widened FWM spectrum would incur additional loss relative to the case where no FWM occurs. Since FWM is a nonlinear effect that scales with optical power, higher power spikes caused by relaxation oscillations get partially suppressed.

During normal operation when all input signals 202a-202n are present in the combined signal 203, the gain clamp 322 has little or no effect on the operation of the optical amplifier 112. This is because the gain of the gain clamp 322 is at or close to 0 dB, and there is little or no gain clamp output 326b being provided to the second amplifier stage 302b. When one or some of the input optical signals 202a-202n are lost or otherwise reduced in optical power, the gain of the first amplifier stage 302a naturally begins to increase (due to the reduction of input optical power in the signal 203), which activates the gain clamp 322. The gain clamp power 326 in the gain clamp 322 therefore increases until it is similar to the output power of the first amplifier stage 302a during normal operation. In other words, the gain clamp power 326 increases until the gain of the first amplifier stage 302a is reduced to approximately the normal gain value (depending on the value of the gain clamp's loss). The gain clamp output 326b from the gain clamp 322 is also amplified by the second amplifier stage 302b, which helps to saturate or otherwise adjust the gain of the second amplifier stage 302b to a similar value as during normal operation. The overall result of this is that the total gain of the optical amplifier 112 remains substantially the same as during normal operation. This effectively provides an amplifier gain that is largely independent of input signal power, even when operating the amplifier at a fixed pump power.

The gain clamp output 326b that is amplified by the second amplifier stage 302b here may be included in the amplified output signal 204, which helps keep the output power from the optical amplifier 112 substantially the same as during normal operation. This effectively provides an amplifier output power that is largely independent of input signal power, even when operating the amplifier at a fixed pump power. If desired, however, an optical demultiplexer 342 may be used to separate the gain clamp output 326b as amplified by the second amplifier stage 302b (referred to as an amplified gain clamp output) from the amplified version of the signal 203 to produce the amplified output signal 204. In those embodiments, the optical amplifier 112 has substantially constant gain but does not provide power loading at the gain clamp wavelength. Thus, the optical amplifier 112 would not operate with a substantially-constant total output power (which may be acceptable in some cases). The optical demultiplexer 342 includes any suitable structure configured to demultiplex or otherwise separate multiple optical signals.

The optical amplifier 112 shown in FIG. 4 is very similar to the optical amplifier 112 shown in FIG. 3. However, in FIG. 3, the pump power 308b from the pump source 304 and the gain clamp output 326b from the gain clamp 322 pass through the second amplifier stage 302b in opposite directions. In contrast, in FIG. 4, the pump power 308b from the pump source 304 and the gain clamp output 326b from the gain clamp 322 pass through the second amplifier stage 302b in the same direction. This is accomplished by swapping the positions of the second amplifier stage 302b and the optical multiplexer 314. The embodiment shown in FIG. 3 may provide for better saturation of the gain of the second amplifier stage 302b, but both embodiments shown in FIGS. 3 and 4 may still function to saturate the gain of the second amplifier stage 302b and therefore provide a substantially constant gain.

The optical amplifier 112 shown in FIG. 5 includes the multiple amplifier stages 302a-302b, the at least one pump source 304 that generates the pump power 308, the optical splitter 310 that splits the pump power 308 into pump power 308a and pump power 308b, and the optical multiplexers 312 and 314. The optical amplifier 112 shown in FIG. 5 also includes the gain flattening filter 320 between the amplifier stages 302a-302b. The optical amplifier 112 shown in FIG. 5 further includes the gain clamp 322, which contains the same components described above. For instance, the gain clamp 322 includes the circulator 324 that directs any gain clamp power 326 flowing through the first amplifier stage 302a into the gain clamp 322, as well as the optical splitter 328 that divides the gain clamp power 326 into the gain clamp power 326a and the gain clamp output 326b. The gain clamp 322 also includes the optical multiplexer 332, and the gain clamp 322 may optionally include the optical attenuator 330, the optical filter 338, and/or the nonlinear optical limiter 340. In addition, the optical amplifier 112 shown in FIG. 5 may include the optional optical attenuator 334.

The optical amplifier 112 in FIG. 5 uses a different mechanism to provide the gain clamp output 326b into the second amplifier stage 302b in order to help saturate or otherwise adjust the gain of the second amplifier stage 302b. In particular, an optical coupler 552 in the form of a first circulator is used to pass the amplified version of the signal 306 generated by the second amplifier stage 302b towards an output of the optical amplifier 112. The optical coupler 552 is also used to pass the gain clamp output 326b from the gain clamp 322 into the second amplifier stage 302b. Also, an optical coupler 554 in the form of a second circulator is used to pass the signal 306 to be amplified to the second amplifier stage 302b. The optical coupler 554 is also used to extract the gain clamp output 326b as amplified by the second amplifier stage 302b.

This approach still effectively provides gain clamping but feeds the gain clamp output 326b to the second amplifier stage 302b in the opposite direction from the direction shown in FIGS. 3 and 4. Note that while the pump power 308b from the pump source 304 and the gain clamp output 326b from the gain clamp 322 pass through the second amplifier stage 302b in opposite directions, a similar change as discussed above may be used here. That is, the optical multiplexer 314 could be moved to the right of the second amplifier stage 302b in FIG. 5 so that the pump power 308b from the pump source 304 and the gain clamp output 326b from the gain clamp 322 pass through the second amplifier stage 302b in the same direction. Each optical coupler 552, 554 includes any suitable structure configured to directionally-multiplex or otherwise provide incoming optical signals to different destinations.

An optional optical multiplexer 556 may be used to combine the signal 306 as amplified by the second amplifier stage 302b (and as provided through the coupler 552) with the gain clamp output 326b as amplified by the second amplifier stage 302b (and as provided through the coupler 554). The combined signal can then be output as the amplified output signal 204, in which case the optical amplifier 112 would support power loading and provide a substantially constant output power. However, if the optical multiplexer 556 is omitted, the amplified output signal 204 would represent the signal 306 as amplified by the second amplifier stage 302b without the amplified gain clamp output 326b, which can allow the output power of the optical amplifier 112 to vary. The optical multiplexer 556 includes any suitable structure configured to multiplex or otherwise combine multiple optical signals.

Although FIGS. 3 through 5 illustrate examples of optical amplifiers 112 that support gain clamping and optionally power loading, various changes may be made to FIGS. 3 through 5. For example, the gain clamps 322 in FIGS. 3 through 5 are shown as forming gain control loops. However, the laser cavities depicted by the loops could also be implemented in-line (in the signal path) with laser power being extracted from the signal path. Also, while the optical amplifiers 112 in FIGS. 3 through 5 all include two amplifier stages, an optical amplifier 112 may include three or more optical amplifier stages and still operate in the same or similar manner as described above. In some cases, a gain clamp can be used around or with the amplifier stage that is closest to the optical fiber(s) carrying the input signal (signal 203 in this example), and the gain clamp output may be used to saturate or otherwise adjust the gain of the amplifier stage that is closest to the optical fiber(s) carrying the output signal (signal 204 in this example). In those cases, each of FIGS. 3 through 5 could be modified to include one or more amplifier stages between the first amplifier stage 302a and the second amplifier stage 302b. However, this is not necessarily required. In examples with more than two amplifier stages, the gain clamp 322 might encompass two or more of the amplifier stages, or the gain clamp output 326b might be routed through two or more of the amplifier stages. Further, while the gain clamps 322 are often described as being inactive until one or some input optical signals are lost/reduced in optical power, in other embodiments the optical amplifier 112 is operated with a gain clamp 322 that is active at all times, and the pump source 304 produces enough pump power to support the largest-designed input optical power. In addition, note that "first" and "second" are used here merely to distinguish between different amplifier stages and do not necessarily require that an amplifier stage actually represents the initial amplifier stage or the next amplifier stage in an amplifier.

Figure 6:
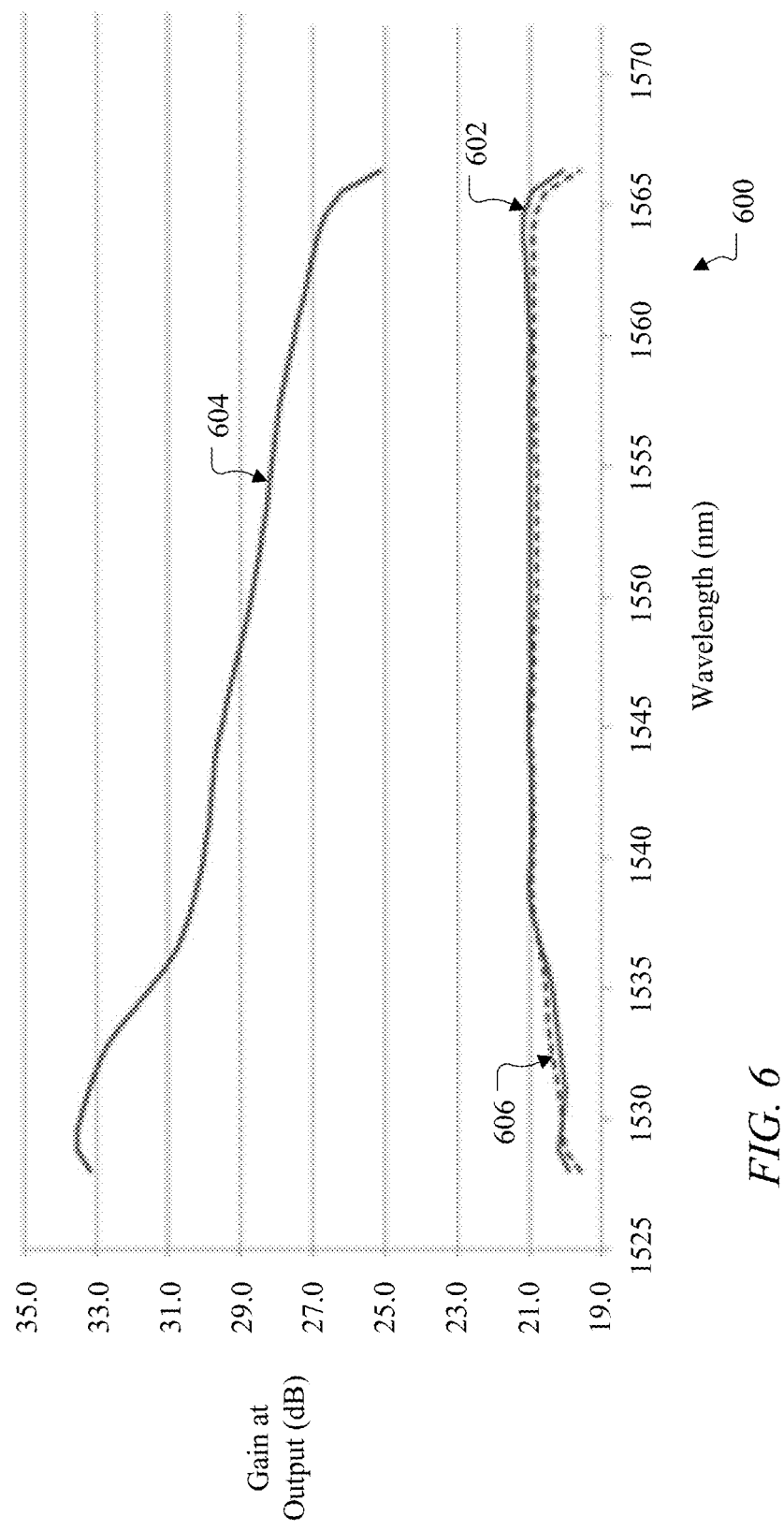
FIG. 6 illustrates an example graph showing gain clamping that can be achieved based on an input power level change to an optical amplifier according to this disclosure.

FIG. 6 illustrates an example graph 600 showing gain clamping that can be achieved based on an input power level change to an optical amplifier according to this disclosure. As shown in FIG. 6, a line 602 represents the normal gains applied by one possible implementation of the optical amplifier 112 to an input optical signal (such as the signal 203) across various wavelengths contained in the input signal. As can be seen here, the gains across the various wavelengths are relatively constant, with the average gain across all of the wavelengths being around 21 dB. Also, the gains here do not have a significant amount of tilt, and the maximum difference between the gains represented by the line 602 is about 1 dB.

A line 604 in the graph 600 illustrates the gains, which are applied by an optical amplifier that lacks gain clamping, when the optical power of the input optical signal suddenly drops by 90% (a −10 dB change in input power) and the pump power remains constant. As shown by the line 604, the gains applied by the optical amplifier across the various wavelengths increases drastically without gain clamping in response to the input power level drop. Also, the gains applied by the optical amplifier here are significantly tilted, and the maximum difference between the gains represented by the line 604 is more than 10 dB. The over-amplification and tilted gains can cause significant problems for optical communications, such as noticeable signal quality degradations or total data loss.

In contrast, a line 606 in the graph 600 illustrates the gains applied by the optical amplifier 112, which supports gain clamping, when the optical power of the input optical signal suddenly drops by 90%. As shown by the line 606, the gains applied by the optical amplifier 112 across the various wavelengths can remain substantially constant compared to the gains represented by the line 602. In other words, the gains applied by the optical amplifier 112 remain substantially the same regardless of whether the input optical power is 100% or 10% of nominal. In this example, the gains represented by the line 606 are within ±0.5 dB or less of the corresponding gains represented by the line 602. This indicates that the gain clamping functionality described above can operate successfully to clamp the gains applied by the optical amplifier 112, even in the presence of significant input optical power losses.

Figure 7A:
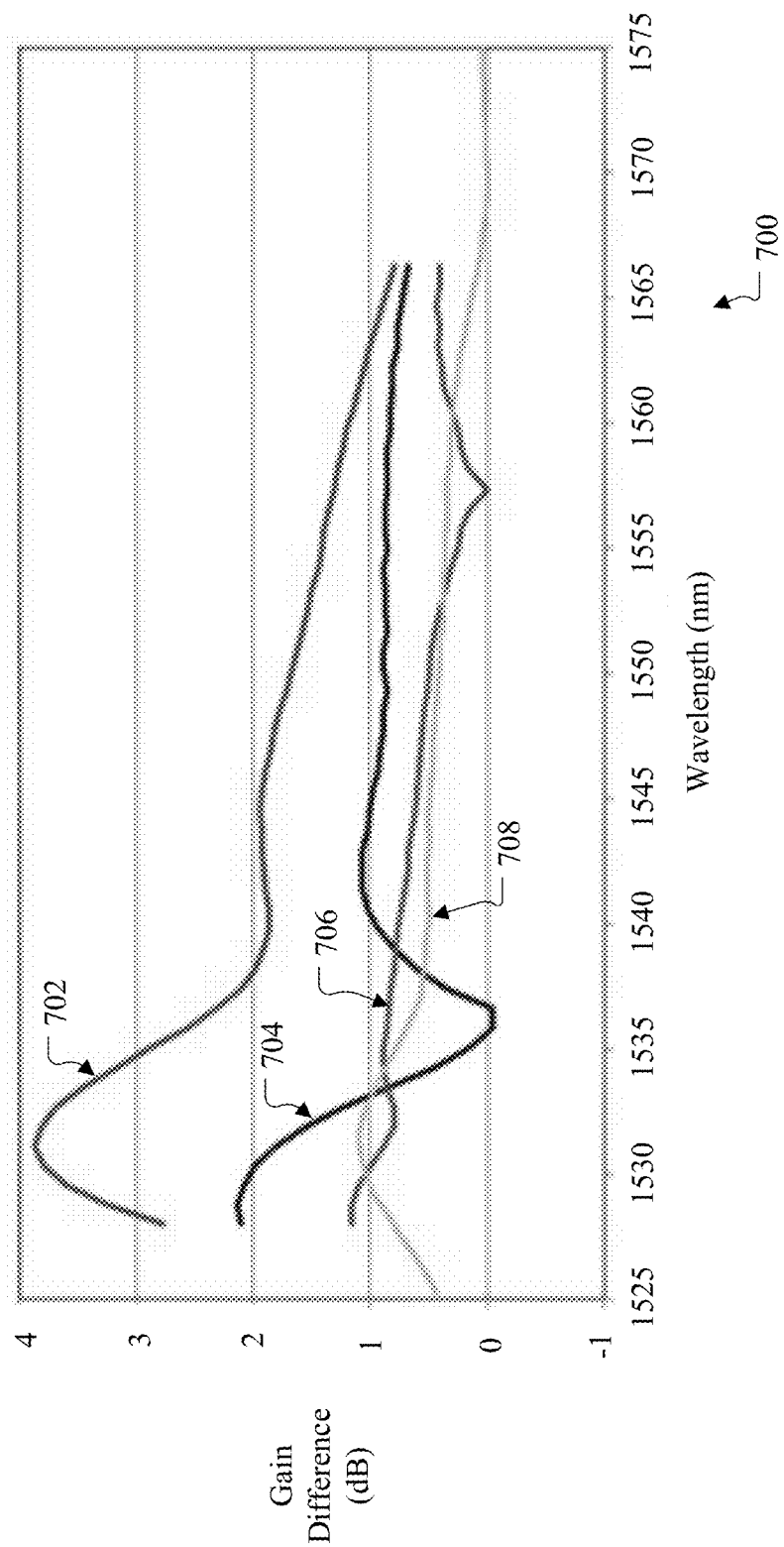
FIGS. 7A and 7B illustrate example graphs showing gain clamping differences based on different input power level changes for different optical amplifiers according to this disclosure.
Figure 7B:
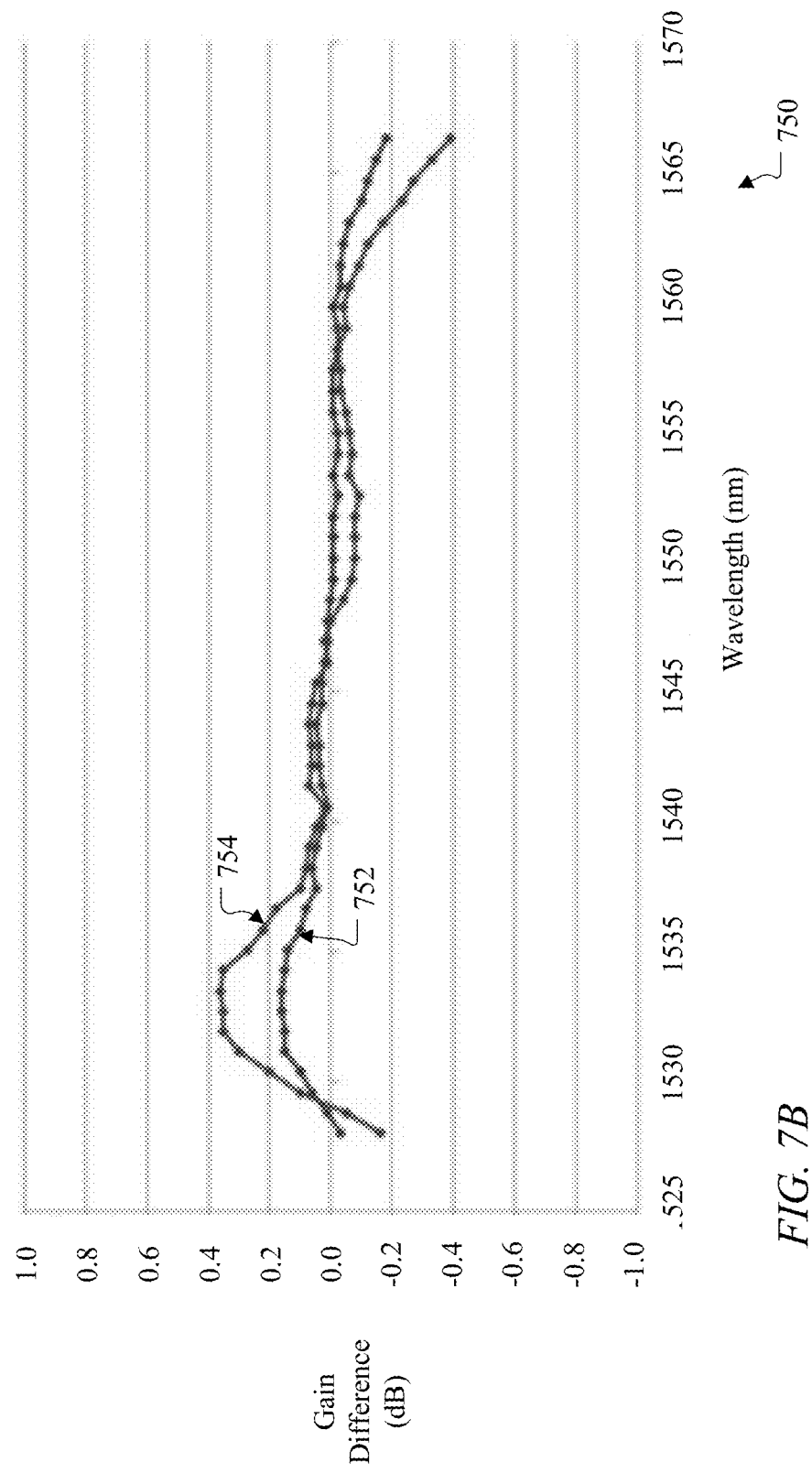

FIGS. 7A and 7B illustrate example graphs showing gain clamping differences based on different input power level changes for different optical amplifiers according to this disclosure. In particular, FIG. 7A illustrates an example graph 700 showing gain clamping differences that can be achieved based on an input power level change to an optical amplifier according to conventional gain-clamping techniques. In FIG. 7A, the graph 700 shows measurements of spectral hole burning at different lasing (gain clamping) wavelengths for an erbium-doped fiber amplifier, where all amplifier stages are located within a lasing cavity according to a conventional design. Each measurement here is a gain clamping difference value that represents the difference in amplifier gain between the normal case (100% input optical power) and a reduced input optical power (10% input optical power) at specified lasing wavelengths. Lines 702, 704, 706, and 708 are respectively associated with lasing (gain clamping) wavelengths of 1525 nm, 1536 nm, 1558 nm, and 1569 nm. As can be seen here, there are significantly large gain differences that occur in each line 702-708, which is indicative of the lasing wavelength locally saturating the gain relative to the other input signal wavelengths. Thus, FIG. 7A demonstrates that it is not possible to achieve an average gain difference of about 0 dB using gain clamping where all amplifier stages are located within the gain clamp (or lasing cavity). This is because the local depression in gain due to spectral hole burning results in 0 dB gain difference at the lasing wavelength (within the spectral hole) and significantly higher than 0 dB gain difference at all other wavelengths.

FIG. 7B illustrates an example graph 750 showing gain clamping differences that can be achieved based on different input power level changes to an optical amplifier designed in accordance with the disclosure above. In FIG. 7B, the graph 750 shows gain clamping differences that can be achieved using one possible implementation of the optical amplifier 112. As shown in FIG. 7B, a line 752 represents the gain clamping differences that might occur in the optical amplifier 112 when the optical power of its input optical signal suddenly drops by 50% (a −3 dB change in input signal power). Also, a line 754 represents the gain clamping differences that might occur in the optical amplifier 112 when the optical power of its input optical signal suddenly drops by 90% (a −10 dB change in input signal power). Each gain clamping difference value here represents the difference in amplifier gain between the normal case (100% input optical power) and a reduced input optical power (either 50% or 10% input optical power) for the case where the lasing (or gain clamping) wavelength is 1568.5 nm. As can be seen in FIG. 7B, both lines 752 and 754 are at 0 dB or are generally within close proximity of 0 dB. In this particular example, all of the gain clamping difference values represented by the lines 752 and 754 are within a range of ±0.4 dB. This indicates that the gain clamping functionality described above can operate successfully to clamp the gains being applied by the optical amplifier 112, even in the presence of significant input optical power losses.

In addition, if the optical amplifier 112 implements the power loading functionality described above, the total output power of the optical amplifier 112 may remain substantially constant during use. Table 1 below illustrates example optical powers that may be associated with an optical signal being amplified by one possible implementation of an optical amplifier 112, the gain clamping power 326b as amplified by the second amplification stage, and the total output power of the optical amplifier 112.

TABLE 1

| Optical Signal Output Power (dBm) | Gain Clamping Power (dBm) | Total Output Optical Power (dBm) |
|---|---|---|
| 17.6 | −1 | 17.7 |
| 14.7 | 14.3 | 17.5 |
| 7.8 | 16.9 | 17.4 |

As can be seen here, the total output power of the optical amplifier 112 remains substantially constant, differing by only 0.3 dB. This indicates that the power loading functionality described above can operate successfully to supply additional output optical power, even in the presence of significant input optical power losses and while an amplifier operates at substantially constant gain.

Although FIGS. 6, 7A, and 7B illustrate example graphs showing gain clamping and gain clamping differences that can be achieved, various changes may be made to FIGS. 6, 7A, and 7B. Also, various changes may be made to Table 1 above. For example, FIGS. 6, 7A, and 7B and Table 1 are merely meant to illustrate the types of results that could be obtained using the gain clamping and power loading functionality described in this patent document and do not limit the gain clamping and power loading functionality to the specific results shown here. Specific implementations of the gain clamping functionality and the power loading functionality may achieve different results than the results shown here.

Figure 8:
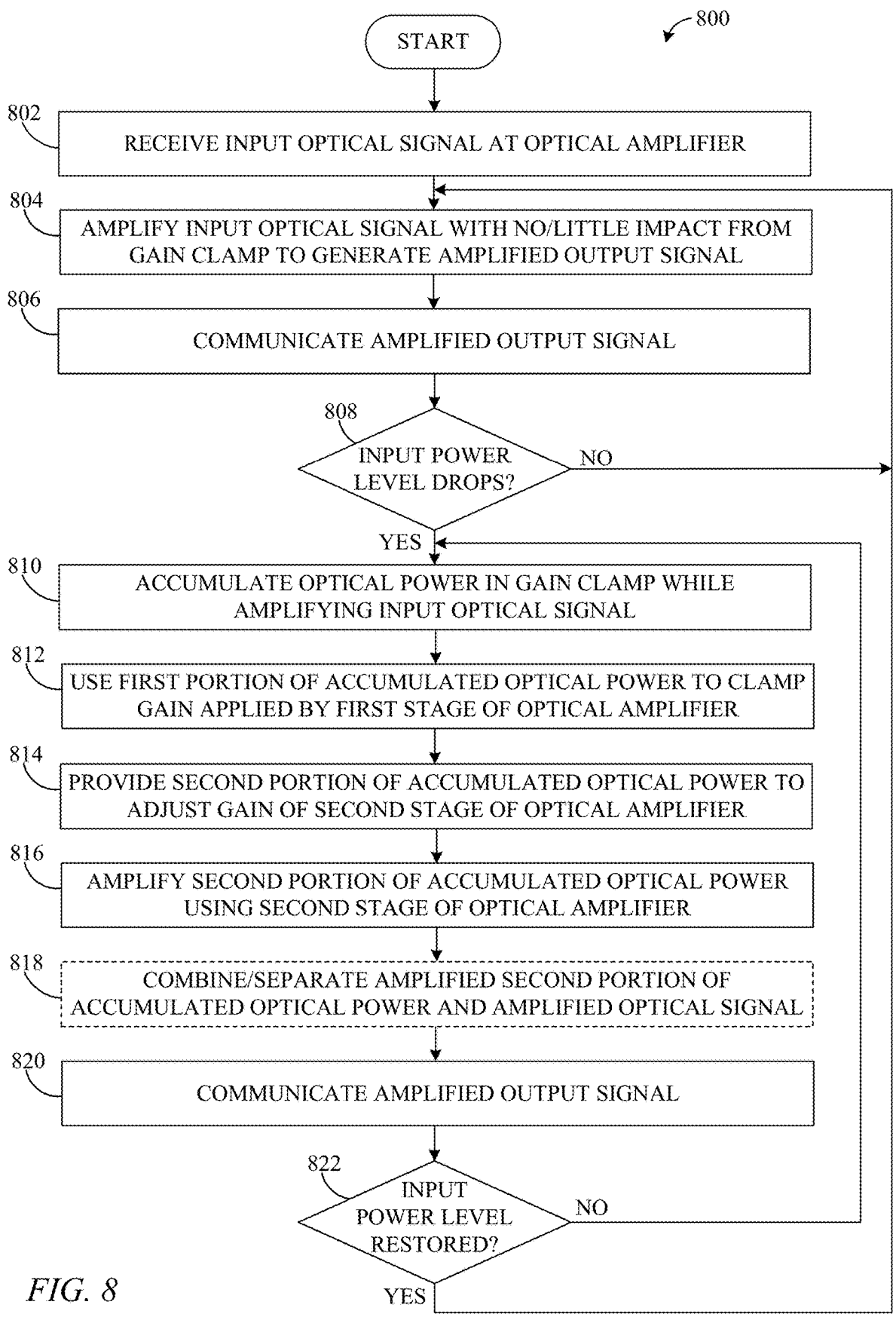
FIG. 8 illustrates an example method for gain clamping and optionally power loading in an optical amplifier according to this disclosure.

FIG. 8 illustrates an example method 800 for gain clamping and optionally power loading in an optical amplifier according to this disclosure. For ease of explanation, the method 800 is described as involving the use of the optical amplifier 112 of FIG. 3, 4, or 5 in the terminal 102 of FIG. 2 and the network 100 of FIG. 1. However, the method 800 may involve the use of any suitable optical amplifier designed in accordance with this disclosure, and the optical amplifier may be used in any suitable device, system, or network.

As shown in FIG. 8, an input optical signal is received at an optical amplifier at step 802. This may include, for example, the optical transmitters 106a-106n of the terminal 102 generating multiple optical signals 202a-202n. This may also include the multiplexer 110 or wavelength-selective switch 206 of the terminal 102 combining the optical signals 202a-202n to produce a combined signal 203, which is provided to the optical amplifier 112.

The optical amplifier amplifies the input optical signal to generate an amplified output signal at step 804. This may include, for example, the multiple amplifier stages 302a-302b of the optical amplifier 112 collectively amplifying the combined signal 203 to produce the amplified output optical signal 204. During this time, a gain clamp 322 of the optical amplifier 112 may have little or no impact on the operation of the optical amplifier 112 or on the generation of the amplified output optical signal 204. The amplified output signal is communicated from the optical amplifier at step 806. This may include, for example, the optical amplifier 112 transmitting the amplified output optical signal 204 over the optical communication pathway 114 or otherwise transmitting the amplified output optical signal 204. As long as the optical power level of the input optical signal remains generally steady at step 808, these operations may continue to occur.

If the optical power level of the input optical signal drops at step 808 (such as due to the loss of one or more signals 202a-202n used to generate the optical signal 203), optical power accumulates in the gain clamp of the optical amplifier while the optical amplifier amplifies the input optical signal at step 810. This may include, for example, gain clamp power 326 accumulating in the gain clamp 322 while the amplifier stages 302a-302b amplify the optical signal 203 having the lower optical power level. A first portion of the accumulated optical power is used to clamp the gain of the first amplifier stage at step 812. This may include, for example, the optical splitter 328 dividing the gain clamp power 326 and providing the gain clamp power 326a back to the first amplifier stage 302a. This may also optionally include attenuating and/or filtering the gain clamp power

326*a*. The presence of the gain clamp power 326*a* flowing through the first amplifier stage 302*a* helps to clamp the gain of the first amplifier stage 302*a*.

A second portion of the accumulated optical power is provided from the gain clamp to the second amplifier stage and is used to adjust the gain of the second amplifier stage at step 814. This may include, for example, providing the gain clamp output 326*b* to the second amplifier stage 302*b*. This may also include optionally attenuating and/or filtering the gain clamp output 326*b*. The second portion of the accumulated optical power is amplified by the second amplifier stage at step 816. This may include, for example, the second amplifier stage 302*b* amplifying the gain clamp output 326*b* passing through the second amplifier stage 302*b*. The presence of the gain clamp output 326*b* flowing through the second amplifier stage 302*b* helps to clamp the gain of the second amplifier stage 302*b*.

Optionally, the amplified second portion of the accumulated optical power and the amplified optical signal are combined or separated as needed at step 818. In FIGS. 3 and 4, this may include the optical demultiplexer 342 separating the amplified version of the gain clamp output 326*b* from the amplified version of the optical signal 306 to produce the amplified output optical signal 204. In FIG. 5, this may include the optical multiplexer 556 combining the amplified version of the gain clamp output 326*b* with the amplified version of the optical signal 306 to produce the amplified output optical signal 204. The resulting amplified output optical signal (which may or may not include the amplified second portion of the accumulated optical power) is communicated at step 820.

As long as the optical power level of the input optical signal remains low at step 822, steps 810-820 may continue to occur. However, if the optical power level of the input optical signal is restored at step 822, the process returns to step 804, where (eventually) the gain clamp returns to having little or no impact on the operation of the optical amplifier 112.

Although FIG. 8 illustrates one example of a method 800 for gain clamping and optionally power loading in an optical amplifier, various changes may be made to FIG. 8. For example, while shown as a series of steps, various steps in FIG. 8 may overlap, occur in parallel, occur in a different order, or occur any number of times. As a particular example, steps 804-806 may overlap during normal operation of the optical amplifier 112, and steps 810-820 may overlap during gain-clamping operation of the optical amplifier 112.

It may be advantageous to set forth definitions of certain words and phrases used throughout this patent document. The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of the invention as defined by the following claims.

What is claimed is:

1. An apparatus comprising:
   an optical amplifier configured to receive an input optical signal and generate an amplified output optical signal, the optical amplifier comprising multiple amplifier stages including at least a first amplifier stage and a second amplifier stage; and
   a gain clamp configured to:
      accumulate optical power from the first amplifier stage after an optical power level of the input optical signal drops and provide a first portion of the accumulated optical power to the first amplifier stage to clamp a gain applied by the first amplifier stage; and
      provide a second portion of the accumulated optical power to the second amplifier stage to adjust a gain applied by the second amplifier stage;
   wherein the second amplifier stage is configured to amplify the second portion of the accumulated optical power.

2. The apparatus of claim 1, wherein:
   the gain clamp comprises:
      an optical splitter configured to receive the accumulated optical power and to split the accumulated optical power into the first and second portions; and
      a first optical multiplexer configured to provide the first portion of the accumulated optical power to the first amplifier stage; and
   the optical amplifier further comprises a second optical multiplexer configured to provide the second portion of the accumulated optical power to the second amplifier stage.

3. The apparatus of claim 2, wherein the apparatus further comprises:
   at least one pump source configured to generate first optical pump power and second optical pump power;
   a third optical multiplexer configured to provide the first optical pump power to the first amplifier stage; and
   a fourth optical multiplexer configured to provide the second optical pump power to the second amplifier stage.

4. The apparatus of claim 3, wherein the second and fourth optical multiplexers are configured to provide the second optical pump power and the second portion of the accumulated optical power to the second amplifier stage in opposite directions.

5. The apparatus of claim 3, wherein the second and fourth optical multiplexers are configured to provide the second optical pump power and the second portion of the accumulated optical power to the second amplifier stage in a common direction.

6. The apparatus of claim 2, wherein one of the first optical multiplexer or the gain clamp comprises a filter configured to force the accumulated optical power to at least one wavelength that is not included in the input optical signal.

7. The apparatus of claim 1, wherein the gain clamp comprises a nonlinear optical limiter configured to limit spikes in the accumulated optical power.

8. The apparatus of claim 1, wherein one of:
the second amplifier stage is configured to generate the amplified output optical signal as a combination of an amplified version of the input optical signal and an amplified version of the second portion of the accumulated optical power; or
the apparatus further comprises an optical multiplexer configured to combine the amplified version of the input optical signal with the amplified version of the second portion of the accumulated optical power to produce the amplified output optical signal.

9. The apparatus of claim 1, wherein the apparatus further comprises an optical demultiplexer configured to separate an amplified version of the input optical signal from an amplified version of the second portion of the accumulated optical power, the amplified version of the input optical signal representing the amplified output optical signal.

10. The apparatus of claim 1, wherein the apparatus further comprises at least one of:
a first attenuator configured to reduce a power level of the first portion of the accumulated optical power; and
a second attenuator configured to reduce a power level of the second portion of the accumulated optical power.

11. The apparatus of claim 1, wherein the gain clamp is configured to provide the first portion of the accumulated optical power to the first amplifier stage and to provide the second portion of the accumulated optical power to the second amplifier stage in order to maintain an overall gain of the optical amplifier substantially constant regardless of whether the optical power level of the input optical signal has dropped.

12. The apparatus of claim 1, wherein the optical amplifier is configured to include an amplified version of the second portion of the accumulated optical power in the amplified output optical signal in order to maintain a total output power substantially constant regardless of whether the optical power level of the input optical signal has dropped.

13. A system comprising:
one or more optical transmitters configured to generate multiple optical wavelength signals;
a first optical multiplexer configured to combine the optical wavelength signals and generate an input optical signal;
an optical amplifier configured to receive and amplify the input optical signal and generate an amplified output optical signal, the optical amplifier comprising multiple amplifier stages including at least a first amplifier stage and a second amplifier stage; and
a gain clamp configured to:
accumulate optical power from the first amplifier stage after an optical power level of the input optical signal drops and provide a first portion of the accumulated optical power to the first amplifier stage to clamp a gain applied by the first amplifier stage; and
provide a second portion of the accumulated optical power to the second amplifier stage to adjust a gain applied by the second amplifier stage;
wherein the second amplifier stage is configured to amplify the second portion of the accumulated optical power.

14. The system of claim 13, wherein:
the gain clamp comprises:
an optical splitter configured to receive the accumulated optical power and to split the accumulated optical power into the first and second portions; and
a second optical multiplexer configured to provide the first portion of the accumulated optical power to the first amplifier stage; and
the optical amplifier further comprises a third optical multiplexer configured to provide the second portion of the accumulated optical power to the second amplifier stage.

15. The system of claim 14, wherein the optical amplifier further comprises:
at least one pump source configured to generate first optical pump power and second optical pump power;
a fourth optical multiplexer configured to provide the first optical pump power to the first amplifier stage; and
a fifth optical multiplexer configured to provide the second optical pump power to the second amplifier stage.

16. The system of claim 14, wherein one of the second optical multiplexer or the gain clamp comprises a filter configured to force the accumulated optical power to at least one wavelength that is not included in the input optical signal.

17. The system of claim 13, wherein the gain clamp comprises a nonlinear optical limiter configured to limit spikes in the accumulated optical power.

18. The system of claim 13, wherein one of:
the second amplifier stage is configured to generate the amplified output optical signal as a combination of an amplified version of the input optical signal and an amplified version of the second portion of the accumulated optical power; or
the optical amplifier further comprises a second optical multiplexer configured to combine the amplified version of the input optical signal with the amplified version of the second portion of the accumulated optical power to produce the amplified output optical signal.

19. The system of claim 13, wherein the optical amplifier further comprises an optical demultiplexer configured to separate an amplified version of the input optical signal from an amplified version of the second portion of the accumulated optical power, the amplified version of the input optical signal representing the amplified output optical signal.

20. The system of claim 13, wherein the gain clamp is configured to provide the first portion of the accumulated optical power to the first amplifier stage and to provide the second portion of the accumulated optical power to the second amplifier stage in order to maintain an overall gain of the optical amplifier substantially constant regardless of whether the optical power level of the input optical signal has dropped.

21. The system of claim 13, wherein the optical amplifier is configured to include an amplified version of the second portion of the accumulated optical power in the amplified output optical signal in order to maintain a total output power substantially constant regardless of whether the optical power level of the input optical signal has dropped.

22. The system of claim 13, wherein the optical multiplexer comprises a wavelength-selective switch.

23. The system of claim 13, wherein the system further comprises:
- an optical channel monitor configured to measure optical power at multiple wavelengths included in the optical wavelength signals; and
- an optical power source configured to generate optical loading power at one or more of the wavelengths identified by the optical channel monitor as lacking optical power.

24. A method comprising:
- receiving an input optical signal at an optical amplifier, the optical amplifier comprising multiple amplifier stages including at least a first amplifier stage and a second amplifier stage;
- using the optical amplifier, generating an amplified output optical signal;
- using a gain clamp:
  - accumulating optical power from the first amplifier stage after an optical power level of the input optical signal drops and providing a first portion of the accumulated optical power to the first amplifier stage to clamp a gain applied by the first amplifier stage; and
  - providing a second portion of the accumulated optical power to the second amplifier stage to adjust a gain applied by the second amplifier stage; and
- using the second amplifier stage, amplifying the second portion of the accumulated optical power.

* * * * *